(12) United States Patent
Lee et al.

(10) Patent No.: US 7,066,590 B2
(45) Date of Patent: Jun. 27, 2006

(54) INK AND UNDERPRINTING FLUID COMBINATIONS WITH IMPROVED INKJET PRINT IMAGE COLOR AND STABILITY

(75) Inventors: Shirley Lee, Poway, CA (US); Gary W. Byers, Vista, CA (US); Alexey S Kabalnov, Corvallis, OR (US); Mark H. Kowalski, Westford, MA (US); Amiya K. Chatterjee, San Diego, CA (US); Keshava A Prasad, San Marcos, CA (US); David M. Schut, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/817,288

(22) Filed: Apr. 1, 2004

(65) Prior Publication Data

US 2004/0189775 A1    Sep. 30, 2004

Related U.S. Application Data

(62) Division of application No. 09/702,185, filed on Oct. 30, 2000, now Pat. No. 6,740,689.

(51) Int. Cl.
*B41J 2/01* (2006.01)
*C08L 39/00* (2006.01)
*C08L 33/08* (2006.01)
*C08L 25/08* (2006.01)
*C09D 11/10* (2006.01)

(52) U.S. Cl. .................. 347/100; 347/98; 524/555; 524/556; 524/577; 523/160

(58) Field of Classification Search .............. 347/98, 347/100; 524/555, 556, 577; 523/160, 161
See application file for complete search history.

(56) References Cited

U.S. PATENT DOCUMENTS

| | | | |
|---|---|---|---|
| 4,694,302 A | 9/1987 | Hackleman et al. | |
| 5,196,056 A | 3/1993 | Prasad | |
| 5,549,740 A | 8/1996 | Takahashi et al. | |
| 5,624,484 A | 4/1997 | Takahashi et al. | |
| 5,640,187 A | 6/1997 | Kashiwazaki et al. | |
| 5,700,314 A | 12/1997 | Kurbayashi et al. | |
| 5,746,818 A | 5/1998 | Yatake | |
| 5,792,249 A | 8/1998 | Shirota et al. | |
| 5,889,083 A | 3/1999 | Zhu | |
| 6,004,389 A | 12/1999 | Yatake | |
| 6,080,229 A | 6/2000 | Watanabe et al. | |
| 6,106,598 A | 8/2000 | Iijima | |
| 6,261,350 B1 | 7/2001 | Kabalnov | |
| 6,299,675 B1 | 10/2001 | Ono et al. | |
| 6,450,632 B1 * | 9/2002 | Tsang et al. | 347/96 |
| 6,460,989 B1 * | 10/2002 | Yano et al. | 347/101 |

FOREIGN PATENT DOCUMENTS

| | | |
|---|---|---|
| EP | 0697445 | 2/1996 |
| EP | 735120 | 10/1996 |

* cited by examiner

*Primary Examiner*—Callie Shosho

(57) ABSTRACT

Combinations of cationic underprinting fluids and anionic ink compositions that together achieve improved color quality and image stability in ink-jet printed images.

18 Claims, 15 Drawing Sheets

INK AND UNDERPRINTING FLUID COMBINATIONS WITH IMPROVED INKJET PRINT IMAGE COLOR AND STABILITY

This is a divisional of Application Ser. No. 09/702,185 filed Oct. 30, 2000, now U.S. Pat. No. 6,740,689.

FIELD OF INVENTION

The present invention relates to the use of underprinting fluid in inkjet printing, and, more specifically, to chemical compositions of ink and underprinting fluid that combined together achieve improvements in both color and stability of printed images.

BACKGROUND OF INVENTION

The use of ink-jet printing systems has grown dramatically in recent years. This growth may be attributed to substantial improvements in print resolution and overall print quality coupled with appreciable reduction in cost. Today's inkjet printers offer acceptable print quality for many commercial, business, and household applications at costs fully an order of magnitude lower than comparable products available just a few years ago. Notwithstanding their recent success, intensive research and development efforts continue toward improving ink-jet print quality, while further lowering cost to the consumer.

An ink-jet image is formed when a precise pattern of dots is ejected from a drop-generating device known as a "printhead" onto a printing medium. Inks normally used in ink-jet recording are commonly composed of water-soluble organic solvents (humectants, etc.), surfactants, and colorants in a predominantly aqueous fluid. When a recording is made on "plain paper", the deposited colorants retain some mobility, which can be manifest in poor bleed, edge acuity, feathering, and inferior optical density/chroma (due to penetration of the paper). These features adversely impact text and image quality.

The evaporation rate of water-based inks is low and they dry primarily by the adsorption into paper. The adsorption time of an ink is dependent on many factors, such as the ink drop size, paper mesh size, ink viscosity, and the ink spreading coefficient over the paper (that is, the surface tension of the paper minus the surface tension of inks and the interfacial tension of the paper-ink interface). There is a considerable interest in reducing the ink drying time, in particular, for high throughput printers. However, shortening the drying time is normally attained at the expense of the image quality. Thus, adding surfactants to inks can significantly reduce the penetration time. This however decreases the optical density/chroma and the edge acuity of the image, as well as ultimately leading to strikethrough problems, because of the penetration of the colorants in normal and lateral directions of the paper. It would be desirable therefore to separate the colorant and the ink vehicle on paper so that the dyes stay at the surface, while the vehicle is quickly adsorbed. Various approaches have been used to achieve this. Differential dye solubility, that is, using dyes that are soluble in ink but insoluble on paper, has been used with limited success. These approaches take advantage of dye solubility and other chemistry changes, caused especially by pH changes in the ink as it goes into the paper. Dye solubility also changes as water, or other solvent, evaporates from the media. Another drawback of these approaches is that they require the dye to be close to its solubility limit in the ink. When the ink is close to its solubility limit, this invariably creates reliability problems primarily due to decap and kogation. As lower and lower ink drop weights are required in ink-jet printers, these reliability issues become more difficult to solve with the conventional approaches.

To address these problems, methods have been described in which a "fixer" solution, with components to reduce colorant mobility, is deposited on the paper prior to depositing the ink. As described, this "under-printing" of imaging ink uses compositions containing acids, salts, and organic counter ions and polyelectrolytes. Underprinting is defined as applying a transparent liquid on paper just before applying inks. The idea was to apply "a separate reactive component" before the inks in order to improve waterfastness. The "reactive component" reacts with a reactant present in the inks, producing a polymer that binds the colorant and makes it waterfast. Bifunctional acylchlorides and bifunctional amines are given as possible reactive pairs. However, acylchlorides are very reactive and require a nonaqueous ink vehicle. Another example of a reactive pair includes carboxymethylcellulose in the presence of aluminum salt which together form a gel. This reaction is more benign than the first, but has the drawback that carboxymethylcellulose solutions have a high viscosity even without the polyvalent ions present. This makes it difficult to use in an inkjet.

In other disclosures, the underprinting idea has been further developed. Using a cationic "liquid composition", such as a polyallylamine for underprinting of anionic dyes has been suggested, to achieve a fixer, which reacts broadly with dye based systems as a whole. This fixer moderately improves waterfastness, edge acuity and bleed but fails to achieve chroma and/or optical density improvement as is achieved with the present invention.

A broad class of underprinting liquids for pigments has also been disclosed, including polymer latexes, silica, alumina and titanium oxide particles, polymer resins, buffer solutions, and inorganic salts. All these underprinting liquids destabilize the pigment dispersions by various mechanisms. As a result, the pigment substantially precipitates at the surface of the paper, while the vehicle is quickly adsorbed.

Another system has been described that uses water-soluble dyes and an underprinting fixer. The fixer contains ligand-complexed metal ions (metal ion with an associated ligand). The ink used in this system contains an anionic component, which may be the dye itself. The ink may also contain a polymeric viscosity modifier in the ink. The specific polymeric viscosity modifier disclosed is an ethylene oxide adduct of acetylene glycol—a neutral polymer which unlike the present invention does not interact strongly with the fixer.

Another system disclosed uses dispersed pigment colorants and requires a glycol ether cosolvent in the ink. This is unlike the system of the present invention, which uses water soluble dye colorants with little cosolvent restriction.

Yet another disclosed system uses a dispersed pigment (a pigment and a water-soluble resin for dispersing the pigment). It does not teach that such a water soluble polymer might be used as a "binder" in a water soluble dye based system and in fact refers to binder-like polymers as being undesirable because of increased viscosity, poor discharge stability, and clogging.

SUMMARY OF THE INVENTION

The present invention relates to an ink-jet printing apparatus, comprising: at least one printhead portion including an underprinting fixer fluid comprising at least one cationic component and at least one printhead portion including an ink composition comprising at least one anionic component; wherein, when the ink composition and the fixer fluid are mixed together to form a mixture, the mixture is an amorphous viscous fluid, the viscous fluid having a viscosity greater than the ink composition.

The present invention further relates to a dye-based ink-jet ink composition comprising: at least one anionic component, wherein, when the ink composition and a fixer fluid comprising at least one cationic component are mixed together to form a mixture, the mixture is an amorphous viscous fluid, the viscous fluid having a viscosity greater than the ink.

Additionally the present invention relates to an underprinting fixer fluid comprising: at least one cationic component, wherein, when the fixer fluid and an ink-jet ink composition comprising at least one anionic component are mixed together to form a mixture, the mixture is an amorphous viscous fluid, the viscous fluid having a viscosity greater than the ink.

Furthermore, the present invention relates to a method of ink-jet printing, the method comprising the steps of:

a) ejecting at a location on a medium an underprinting fixer fluid comprising at least one cationic component;

b) ejecting at the location on the medium an ink composition comprising at least one anionic component;

wherein when the ink composition and the fixer fluid are mixed together to form a mixture, the mixture is an amorphous viscous fluid, the viscous fluid having a viscosity greater than the ink composition.

DETAILED DESCRIPTION OF THE INVENTION

Figure 1:
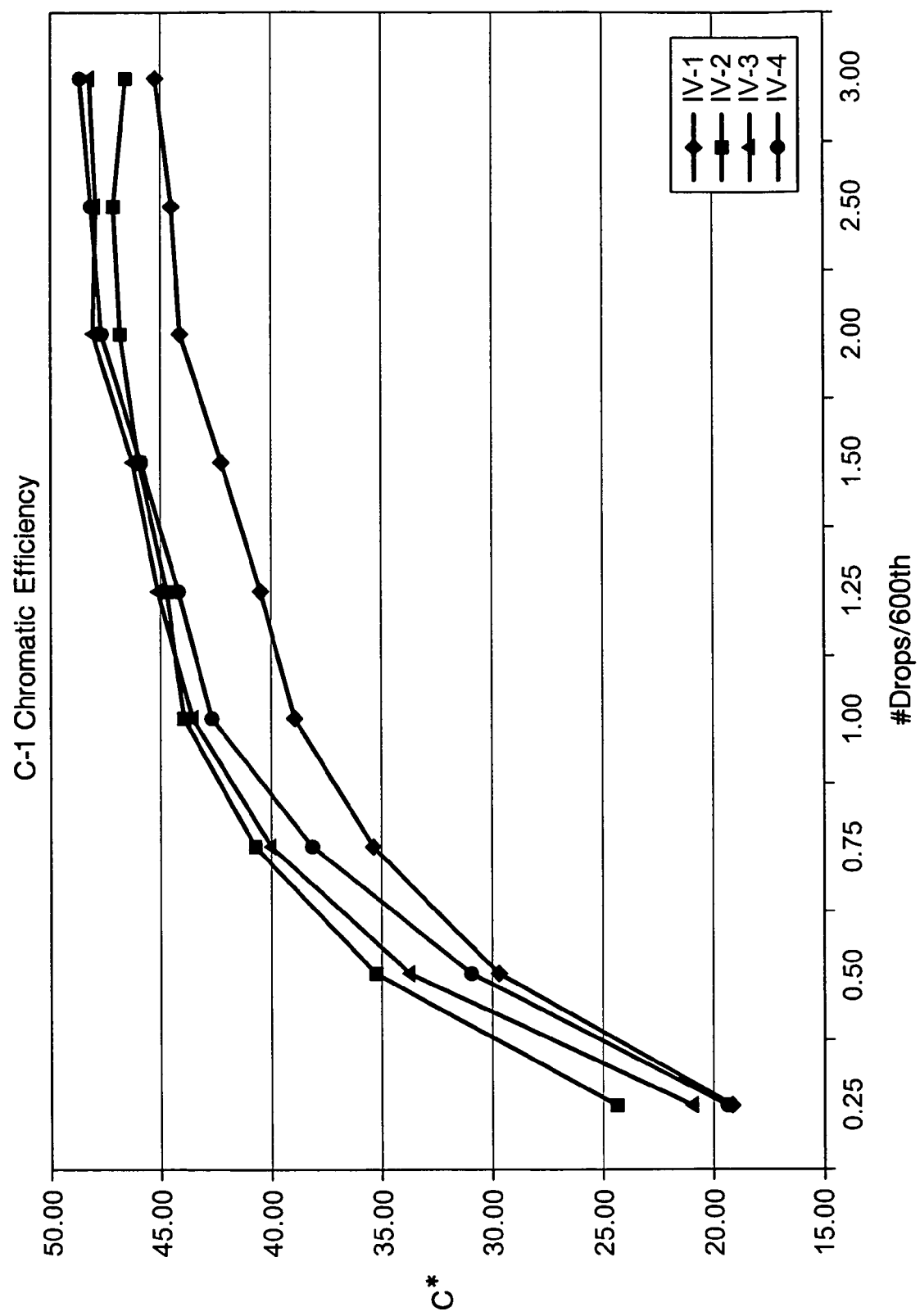
FIG. 1 is a graph comparing the interaction of the C-1 cyan ink of Example 1 (which contains the various binders) with the underprinting fluid. IV-1 contains the blank binder composition, IV-2 contains the SMA-1000H binder, IV-3 contains the SMA-2000H binder, and IV-4 contains the SMA-3000H binder.

The present invention described herein is directed to ink-jet inks for printing ink-jet images using commercially available inkjet printers such as, for example but not limited to, HP DeskJet® printers, manufactured by Hewlett-Packard Company, of Palo Alto, Calif. The inks enable production of near photographic images having little or no coalescence, excellent waterfastness, and reduced dry time, on a range of print media, in particular, for example but not limited to, plain white, 8½"×11", 20 lb. weight, printer paper conventionally used for office and home computers.

More specifically, the present invention relates to the improvement of color print quality and permanence of inkjet output. This is specifically achieved by focusing on the problem of obtaining good chroma/optical density in inkjet printed image colors and blacks while still maintaining good edge acuity, minimal strikethrough, fast drying time, and excellent waterfastness of dye-based inks. The present inventors have found that when an ink layer with anionic components is printed over an underprinting fixer fluid layer with cationic components that interactions between the oppositely charged components of the two layers can be tailored to achieve not only higher chroma with primary colors but also significantly higher chroma of secondary colors (mixtures of primary colors) and significantly higher optical density of composite blacks. These unexpected results are likely due to the fact that colorant gelation and colorant immobilization rather than quick colorant precipitation are achieved with the anionic/cationic interactions between the ink and fixer layers of the present invention. Such colorant gelation and colorant immobilization yield significantly higher color values than quick colorant precipitation, which yields darker, "muddier" colors. Also, because the gelation process is not as fast as the precipitation that is typically found when underprinting dispersed pigmented systems, the dot gain of the ink is greater, covering more space. Therefore it requires less ink.

Underprinting of Dyes with Polyvalent Salts

Most commercial water-soluble dyes contain anionic groups, such as sulfonates and carboxylates, which render the dyes water-soluble. These groups often function as reaction sites for the precipitation of the dye with the fixer on top of the paper after underprinting fluid and ink are applied to the paper. Usually, underprinting is conducted by printing a fluid on the paper at a certain pixel location before the ink image is printed in the same pixel location. Thus, for example, when a sulfonate dye $D\text{-}SO_3^-Na^+$ is underprinted with a divalent $M^{2+}X^-_2$ salt fixer solution, the following reactions can occur (for illustration, the sodium salt of the dye is used; other salts may also be considered):

(A)

$$D\text{-}SO_3^-Na^+ + M^{2+}X^-_2 \rightarrow D\text{-}SO_3^-X^-M^{2+} + NaX \quad (1)$$

(B)

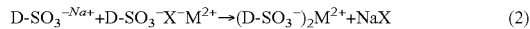

$$D\text{-}SO_3^{-Na+} + D\text{-}SO_3^-X^-M^{2+} \rightarrow (D\text{-}SO_3^-)_2 M^{2+} + NaX \quad (2)$$

Ionic reactions in aqueous solutions have low activation energy and proceed in the diffusional direction. This means that the quickest precipitation will be attained when the equilibria of equations (1) and (2) are shifted more towards the right. This right shift depends on the solubility of the crystalline precipitates $(D\text{-}SO_3^-)_2M^{2+}$ and $D\text{-}SO_3^-X^-M^{2+}$. These solubility values are controlled by the free energy of the crystalline precipitate versus the ions in solution. The quickest precipitation is expected for the metal salts having the lowest solubility with the sulfonate group. Thus, barium chloride is expected to be more efficient in precipitation than calcium chloride, because it has a lower solubility when it reacts with sulfonate group. Also, the higher the valence of the counterion, the higher the chance that the salt (B) will precipitate with sulfonate to form the reaction products. Thus, for three- or four-valent metals, the complex of a type (B) is much favored, because the hydrophobic dye tails are brought in contact and their contact with water is reduced.

The above description would equally apply to sulfonate, carboxylate, sulfate, and phosphate dye species. More specific metal salts would also apply: $BaX_2$, $SrX_2$, $CaX_2$, $ZnX_2$, $MgX_2$, $AlX_3$, $TiX_4$. Other multivalent salts may also be considered.

Even though precipitation of the dye species with the metal salt results in improved color immobility (i.e., bleed control, edge acuity and waterfastness), a significant problem in the reaction of aqueous dyes in ink with polyvalent salts in fixers is that the quick precipitation and/or crystallization of the dyes prevents the dyes from mixing properly, thus causing a significant loss in chroma and/or optical density, and an overall "muddy" appearance.

Overcoming Problems with Underprinting Fixer Fluid

To achieve colorant gelation and colorant immobilization necessary for higher color values, the present inventors experimented with methods for underprinting that rely upon colorant being immobilized or "fixed" through interaction with agents deposited previously in the underprinting fixer solution. Otherwise, without immobilizing reagents being present, the fixer solution serves to facilitate penetration of the subsequent ink deposit. This is particularly true for mobile colorants, such as water-soluble dyes, which penetrate the paper until an immobilizing reagent is encountered. However, the dye-dye association (aggregation) which results from the reaction of water-soluble dyes with immobilizing reagents may introduce additional undesirable spectral adsorption characteristics, perceived as dull colors or "muddiness", which is mostly due to quick crystallization/precipitation of the water-soluble dyes in the ink, which are not given time to mix properly. In other words, the quick crystallization/precipitation of the water-soluble dyes results in colors that are "fixed", i.e., waterfast, but lacking in chroma/optical density characteristics which are highly desirable for color inkjet printing.

Modifying the Dye/Salt Interaction with Anionic Binder in the Ink

The present inventors have found that, in addition to an immobilizing reagent in the fixer fluid, an anionic binder component needs to be included in the water-soluble dye-based ink, which is specifically reactive with the immobilizing reagent in the underprinting fixer fluid. Otherwise, in the absence of the anionic binder component in the ink, underprinting fixer, deposited before the ink, actually causes a decrease in optical density/chroma because it prewets the paper to facilitate ink penetration and causes quick crystallization/precipitation which hampers mixing of dye colors. Although waterfastness improves as a result of the immobilizing reagent in the fixer, the decrease in chroma and/or optical density is objectionable.

The present inventors have found that an effective approach to overcoming the problem of quick crystallization and/or precipitation of dye colors, which hampers mixing of dyes, and thus results in significant "muddiness" of secondary colors and blacks, is the adding of anionic polymeric binders, e.g., styrene maleic anhydride type polymers. Such anionic polymers tend to bind with the salt in the underprinting liquid. This binding tends to curb the quick crystallization/precipitation of the dyes with the salts, thus improving chroma in the printing of colored dyes and improving optical densities in the printing of black dyes. They have also found however, that by curbing crystallization/precipitation too much, the binding also tends to cause a decrease in color immobility (i.e., a decrease in waterfastness and edge acuity and an increase in bleeding).

Reaction of Anionic Dyes with Cationic Surfactants/Polymers

When two oppositely charged hydrophobic species approach each other in solution, they tend to form a complex. The positively and negatively charged groups are attracted together, while their former counter-ions leave their hosts and remain in solution. This behavior is well documented for oppositely charged surfactants, which aggregate into bilayers (lamellar phase and vesicles), and oppositely charged polymer-surfactant pairs, which form a complex and a precipitate. This effect is augmented by the fact that the associating molecules neutralize each others' charge directly and counter-ions are released into the solution. These counter-ions compensate for the loss in entropy, which normally opposes the association.

Accordingly, one can expect to precipitate anionic dyes from the aqueous solution by adding oppositely charged hydrophobic polymers and/or surfactants.

The potential surfactant candidates are:
Tetra substituted ammonium salts $R_1R_2R_3R_4N^+X^-$
Tetra substituted phosphonium salts $R_1R_2R_3R_4P^+X^-$
Tetra substituted arsonium salts $R_1R_2R_3R_4As^+X^-$ where R is H, alkyl, or other organic radical. Particularly beneficial for this purpose are surfactants with very low critical micelle concentrations, so that they do not adsorb at the ink-air interface at the experimental timescale, and therefore, do not act as ink penetrants. To achieve such very low critical micelle concentrations, surfactants must generally have at least 20 carbon atoms.

Even more beneficial are double-tailed surfactants forming vesicles, such as didodecyldimethylammonium, ditetradecyldimethylammonium, dihexadecyldimethylammonium, or dioctadecyldimethylammonium salts. These surfactants form a lamellar phase at room temperature, which can be dispersed into closed bilayer structures called vesicles. Vesicles are expected to be more effective precipitants than surfactant monomers or micelles.

Potential polymer/surfactant candidates are polyelectrolytes containing $R_1R_2R_3R_4N^{+-}$, $R_1R_2R_3R_4P^+$, $R^1R_2R_3R_4As^+$ group, where R can be H, alkyl, or other organic substituent. Particularly beneficial are polymers having a large number of functional groups per repeat unit, e.g., protonated ethyleneimine. When selecting a polymer/surfactant for underprinting, it is important to consider the molecular weight and keep it low (in the range of 1000–10,000), because high-molecular weight polyelectrolytes tend to be very viscous and are not easily used in inkjet.

A number of dyes under development contain amine functionality that makes them anionic in solution and also makes them so they can be protonated. These are termed zwitterionic dyes, and they are known for their ability to become waterfast. These dyes have been used to take advantages of the pH drop from ink (pH=8.50) to paper (typically much lower).

Therefore, depending on what anionic substituent, such as sulfonate, carboxylate, sulfate and phosphate, is present on the dye molecule, it is possible to fine-tune the solubility of the dye. By this means, some control can be achieved over the balance between waterfastness and chroma/optical density of the inkjet printed image on the medium.

The present inventors have used these anionic dyes in combination with underprinting fluid containing cationic polymers and/or surfactants. They have found that this combination tends to fix the dyes on the surface of the paper medium in what appears to be a slightly viscous, amorphous, partially gelled state. At its optimal state, this partially gelled state has both good waterfastness, edge acuity and bleed control and reasonably acceptable (though less than optimum) chroma and/or optical density. It appears that this combination of anionic ink compositions and cationic polymer/surfactants sufficiently slows precipitation of the anionic water-soluble ink dyes to obtain acceptable but not excellent chroma/optical density. At the same time, it also achieves sufficient stratification of the dyes and/or mixtures of dyes to immobilize them on the surface of the paper, thus achieving less strikethrough, better drying time, better waterfastness and better color to color bleed control.

When calcium or other cationic metals are also present in the underprinting fluid, these also bind with the anionic components of the ink, both on the dye molecules and the binders. However, addition of these cationic metals into the ink can modulate the effect of the binding of the anionic components with the cationic polymer/surfactants. Depending on the dye, the presence of these cationic metals in the underprinting fluid can shift the balance towards improved color quality at the expense of decreased image stability due to a shift away from good color immobility (i.e., waterfastness, bleed control, etc.). On the other hand, with other dyes, the opposite trend is seen, improved color stability through better immobilization with a concomitant decrease in color quality (i.e., chroma, hue, and optical density).

Achieving Both Good Color Quality and Image Stability

In one embodiment, the present invention relates to a dye-based ink-jet ink composition comprising: at least one anionic component, wherein, when the ink composition and a fixer fluid comprising at least one cationic component are mixed together to form a mixture, the mixture is an amorphous viscous fluid, the viscous fluid having a viscosity greater than the ink.

In a more preferred embodiment of the above-described invention, the anionic component comprises at least one anionic binder, which may comprise polymers having at least one complexing group. The at least one complexing group may be selected from the group consisting of Ethylene Diamine Tetraacetic Acid, Acetyl Acetonate, Acrylates and Maleic Anhydride.

The polymers having at least one complexing group comprise polymers, which may comprise styrene. In a most preferred embodiment, the anionic binder may comprise hydrolyzed styrene maleic anhydride.

In another more preferred embodiment of the above-described invention, the at least one dye comprises anionic functional groups. This dye may be selected from the group consisting of sulfonated dyes with non-polar groups, dyes with protonatable groups, dyes with carboxylate groups and dyes with phosphonate groups.

In still another more preferred embodiment of the above-described invention, the ink composition further comprises low-molecular weight hydrophilic compounds that may be selected from the group consisting of inorganic salts and lower alcohols.

In another embodiment, the present invention relates to an underprinting fixer fluid comprising: at least one cationic component, and when the fixer fluid and an ink-jet ink composition comprising at least one anionic component are mixed together to form a mixture, the mixture is an amorphous viscous fluid, the viscous fluid having a viscosity greater than the ink.

In a preferred embodiment of the above-described invention, the at least one cationic component may comprise cationic polymers, which may be polyelectrolytes selected from the group consisting of $R_1R_2R_3R_4N^+$; $R_1R_2R_3R_4P^+$ and $R_1R_2R_3R_4As^+$, where R can be H, alkyl or other organic substituent. Furthermore, the polyelectrolytes may comprise branched polymer chains. The cationic polymers may be in solution with non-polymeric cations selected from the group consisting of calcium ions, aluminum ions, barium ions, strontium ions, zinc ions, and magnesium ions, and they may be tetrasubstituted ammonium salts.

In another preferred embodiment of the above-described invention, the at least one cationic component comprises non-polymeric cations selected from the group consisting of calcium ions, aluminum ions, barium ions, strontium ions, zinc ions, magnesium ions and titanium ions.

An important goal of the present invention is to achieve, with normal amounts of ink, higher color quality for dye-based inks (that is, better chroma and/or optical density) while maintaining good color immobility (that is, less strikethrough, better drying time, waterfastness and color to color bleed control) in a straightforward manner, potentially simplifying ink formulas.

Furthermore, following from this goal, this invention should also achieve satisfactory (if less than optimal) color immobility and color quality results when a reduced amount of ink is used, thus prolonging the functional period of use of an ink jet between ink refillings. Control of these attributes can support printer platforms that have enhanced speed and result in prints with increased permanence characteristics.

To achieve the above goals of the present invention, any water-based dyes conventionally used in ink jet inks may be used, although in a preferred embodiment, specialized dye colorants such as anionic and/or zwitterionic dyes are used to obtain better color performance attributes. To optimize both color quality and color immobility, a preferred embodiment should include, in addition to anionic dye colorants, anionic polymeric binders, for example (but not limited to) polymers having a complexing group such as Ethylene Diamine Tetra Acetic Acid (EDTA), acetylacetonate, maleic anhydride and various acrylates.

Besides the dye and binder components of the inks used, the present inventors have found that the underprinting of dye-based inks is a complex task and in a preferred embodiment uses a "cocktail", containing polyelectrolytes, surfactants, acids and salts.

Therefore, the present invention further relates to a method of ink-jet printing comprising the steps of: a) ejecting at a pixel location on a medium an underprinting fixer fluid comprising at least one cationic component; b) ejecting at the pixel location on the medium an ink composition comprising at least one anionic component; wherein when the ink composition and the fixer fluid are mixed together to form a mixture, the mixture is an amorphous viscous fluid, the viscous fluid having a viscosity greater than the ink composition.

In a more preferred embodiment of the above-described invention, the anionic component comprises at least one anionic binder, which may comprise polymers having at least one complexing group. The at least one complexing group may be selected from the group consisting of Ethylene Diamine Tetraacetic Acid, Acetyl Acetonate, Maleic Anhydride and Acrylates. The polymers having at least one complexing group comprise polymers, which may comprise styrene. In a most preferred embodiment, the anionic binder may comprise hydrolyzed styrene maleic anhydride.

In another more preferred embodiment of the above-described invention, the at least one dye comprises anionic functional groups. This dye may be selected from the group consisting of sulfonated dyes with non-polar groups, dyes with protonatable groups, dyes with carboxylate groups and dyes with phosphonate groups.

In still another more preferred embodiment of the above-described invention, the ink composition further comprises low-molecular weight hydrophilic compounds that may be selected from the group consisting of inorganic salts and lower alcohols.

In another embodiment, the present invention relates to an underprinting fixer fluid comprising: at least one cationic component, and when the fixer fluid and an ink-jet ink composition comprising at least one anionic component are mixed together to form a mixture, the mixture is an amorphous viscous fluid, the viscous fluid having a viscosity greater than the ink.

In a preferred embodiment of the above-described invention, the at least one cationic component may comprise cationic polymers, which may be polyelectrolytes selected from the group consisting of $R_1R_2R_3R_4N^+$; $R_1R_2R_3R_4P^+$ and $R_1R_2R_3R_4As^+$, where R can be H, alkyl or other organic substituent. Furthermore, the polyelectrolytes may comprise branched polymer chains. The cationic polymers may be in solution with non-polymeric cations selected from the group consisting of calcium ions, aluminum ions barium ions, strontium ions, zinc ions, magnesium ions and titanium ions, and they may be tetrasubstituted ammonium salts.

In another preferred embodiment of the above-described invention, the at least one cationic component comprises non-polymeric cations selected from the group consisting of calcium ions, aluminum ions, barium ions, strontium ions, zinc ions, magnesium ions and titanium ions.

The above objectives of both good color immobility and good color quality can be achieved in the present invention when the combination of underprinting fluid and dye-based ink together forms a viscous, amorphous gel on the print medium rather than a quickly-forming crystalline precipitate.

Such a viscous, amorphous gel allows the dyes enough time to mix well, while stratifying on the surface of the paper, thus achieving good chroma and/or optical density and avoiding penetration of the dyes into the paper. Such amorphous gel formation/stratification of the dyes occurs while at the same time the water from the ink/underprinting fluid combination quickly penetrates into the paper by vehicle spreading/osmotic pressure effects.

In other words, a necessary condition for the ink/underprinting fluid combination of the present invention is maintaining control of colorant spread and penetration versus vehicle penetration. Thus, the reaction between dye-based ink and underprinting fluid to form the viscous, amorphous mixture described above must take place on a time scale faster than the penetration rate of the ink into the paper in order to stratify dye colorants properly on the surface of the print media. Underprinting fluids may also add surfactants to "carry" the ink vehicle into the paper, allowing much faster penetration times. This approach allows the colorant to stratify, concentrating the colorant on the surface of the paper, boosting chroma and/or optical density, and allowing the bulk of the ink (the vehicle) to penetrate into the media after the ink and underprinting fluid have combined to form a viscous, amorphous gel complex. This can be achieved by the combination of spreading/osmotic pressure effect, which is enhanced if the ink vehicle contains a high concentration of low-molecular weight hydrophilic compounds such as inorganic salts or lower alcohols.

Construction and Operation of One Preferred Embodiment of the Invention

In one embodiment the present invention relates to an ink-jet printing apparatus, comprising:

at least one printhead portion including an underprinting fixer fluid comprising at least one cationic component and at least one printhead portion including an ink composition comprising at least one anionic component; wherein, when the ink composition and the fixer fluid are mixed together to form a mixture, the mixture is an amorphous viscous fluid, the viscous fluid having a viscosity greater than the ink composition. In a more preferred embodiment of the invention described above, the anionic component of the ink comprises at least one anionic binder that may comprise polymers having at least one complexing group. This complexing group may be selected from the group consisting of Ethylene Diamine Tetraacetic Acid, Acetyl Acetonate, Maleic Anhydride, and Acrylates. The polymers may comprise styrene. In a most preferred embodiment the anionic binder comprises hydrolyzed styrene maleic anhydride.

In another more preferred embodiment of the invention described above, the anionic component comprises dye having anionic functional groups. This dye may be selected from the group consisting of sulfonated dyes with non-polar groups, dyes with protonatable groups, dyes with carboxylate groups and dyes with phosphonate groups.

In another more preferred embodiment of the invention described above, the ink composition further comprises low-molecular weight hydrophilic compounds. These compounds may be selected from the group consisting of inorganic salts and lower alcohols.

In yet another preferred embodiment of the invention described above, at least one cationic component comprises cationic polymers. These cationic polymers may be polyelectrolytes selected from the group consisting of $R_1R_2R_3R_4N^+$; $R_1R_2R_3R_4P^+$ and $R_1R_2R_3R_4As^+$, where R can be H, alkyl or other organic substituent. In a most preferred embodiment of the above invention, the polyelectrolytes comprise branched polymer chains.

In another preferred embodiment, the cationic polymers are in solution with non-polymeric cations selected from the group consisting of calcium ions, aluminum ions, barium ions, strontium ions, zinc ions, and magnesium ions). In still another more preferred embodiment, the cationic polymers are tetrasubstituted ammonium salts.

Additionally, in another more preferred embodiment, the at least one cationic component comprises non-polymeric cations selected from the group consisting of calcium ions, aluminum ions, barium ions, strontium ions, zinc ions, and magnesium ions In a preferred non-limiting embodiment of the present invention, a fixer pen is required that leads the color ink pens as the print carriage scans the paper, so that fixer fluid can be deposited approximately 30–100 milliseconds before the color ink is deposited. This can be accomplished with, but is not limited to, a HP2000® printer using HP2000® color pens (8 ng nominal drop weight) in all four slots. Since the fixer pen drop weight matches the color pens, fixer pixel density matches volume density in primary colors. In a typical experiment, diagnostics are printed using unidirectional printing where the fixer pen leads the color pens. For example, to print a red shade, the fixer pen deposits a required amount of fixer fluid, followed by the magenta pen, then the yellow pen. If multipasses are used, the same process repeats on subsequent passes.

Gelation of Ink/Colorants and Immobilization of Dyes with Oppositely Charged Surfactants, Polymers, and Metal Salts In a most preferred embodiment of the present invention, four conditions are present to achieve optimal high color quality (chroma/optical density) and colorant immobilization:

1. Ink is deposited shortly after fixer (i.e., in the same pass).

2. Custom anionic (preferably carboxylated, zwitterionic, or sulfonated ) dyes are used because conventional (highly sulfonated) dyes do not fix as easily.

3. Anionic binders, such as hydrolyzed styrene maleic anhydride, increase color chroma even more than a simple custom dye/fixer approach. Other anionic binders are effective as well.

4. A fixer should contain surfactants (spreading), multivalent metal salts (gelation of binder), and cationic polymers (immobilization of colorant) to achieve optimal results.

The fixer creates a uniform liquid film of cationic material that allows colorant vehicle to penetrate the paper, because of cationic surfactants present in the fixer fluid, but does not allow the anionic binders and colorants to penetrate. This also allows ink mixing at the surface, yielding "pure" (high chroma/optical density) films of secondary colors and composite black. Also, the mixing/gelation process taking place at the surface of the paper is not as fast as the precipitation that typically occurs when underprinting components mix with dispersed colorants in an ink. The dot gain of the ink on the paper is more extensive, covering more space. Therefore it less ink is required to achieve printed images of good color quality.

Surfactants

Surfactants suitably employed in the practice of the invention include cationic, anionic and nonionic surfactants. Examples of anionic surfactants include: Sulfonate surfactants such as Sulfosuccinates (Aerosol OT, A196; AY and GP, available from CYTEC) and Sulfonates (Aerosol DPOS-45, OS available from CYTEC; Witconate C-50H available from WITCO; Dowfax 8390 available from DOW); and Fluoro surfactants (Fluorad FC99C available from 3M). Examples of nonionic surfactants include: Fluoro surfactants (Fluorad FC170C available from 3M); Alkoxylate surfactants (Tergitol series 15S-5, 15S-7, and 15S-9 available from Union Carbide); and Organosilicone surfactants (Silwet L-77 and L-76-9 available from WITCO). These surfactants provide the necessary dot spread on plain paper and special media, such as photobase glossy paper, for providing excellent image quality. Need to find examples of cationic surfactants. Cationic surfactants that may be used in the fixing fluid include: betaines (e.g., Hartofol CB-45 available from Hart Product Corp., Mackam OCT-50 available from McIntyre Group Ltd., Amisoft series available from Ajinomoto), quaternary ammonium compounds (e.g., Glucquat series available from Amerchol, Bardac and Barquat series available from Lonza), cationic amine oxides (e.g., Rhodamox series available from Rhome-Poulenc, Barlox series available from Lonza) and imidazoline surfactants (e.g., Miramine series available from Rhone-Poulenc, Unamine series available from Lonza).

Colorants

The inks made according to the present invention comprise at least one colorant, preferably at least one dye. The amount of dye added to the vehicle in prior compositions and the inventive compositions tend to be a function of choice, and is largely dependent upon solubility of the dye in the vehicle and the color intensity of the dye. Typical amounts of dye are between about 0.1 wt % to about 10 wt % of ink composition, preferably, between about 0.1 and 5 wt %. In compositions of the invention, the dye is preferably colored rather than black, although any of the dyes used in inks for in-jet printers may be employed. Illustrative suitable dyes include Direct Blue 199 (available from Avecia as Projet Cyan Special), Acid Blue 9; Direct Red 9, Direct Red 227, Magenta 377 (available from Ilford AG, Rue de l'Industrie, CH-1700 Fribourg, Switzerland), Acid Yellow 23, Direct Yellow 132, Direct Yellow 86, Yellow 104 (Ilford AG), Direct Yellow 4 (BASF), Yellow PJY H-3BNA (Avecia), and Direct Yellow 50 (Avecia). More preferably, Direct Blue 199, Magenta 377, and Direct Yellow 132 are employed as the cyan, magenta, and the yellow colorants.

Other Ingredients

The inks of the present invention may optionally comprise components such as buffers, metal chelators, and biocides, as are well known in the art of ink-jet ink formulation.

Buffers

Buffers optionally employed in the practice of the invention to modulate pH can be organic-based biological buffers or inorganic buffers, preferably, organic-based. Further, the buffers employed should provide a pH ranging from about 3 to about 9 in the practice of the invention, preferably about 4 to about 6 and most preferably from about 4 to about 5. Examples of preferably-employed buffers include succinic acid, tris(hydroxymethyl)aminomethane, available from companies such as Aldrich Chemical (Milwaukee, Wis.), 4-morpholineethanesulfonic acid (MES), and 4-morpholinepropanesulfonic acid (MOPS). Most preferably, succinic acid is employed in the practice of the invention.

The inks of the present invention optionally comprise 0 to about 1.5 wt % buffer. More preferably, the inks comprise from about 0.1 to about 0.5 wt % buffer, with a concentration from about 0.1 to about 0.3 wt % being the most preferred.

Metal Chelators

Metal chelators optionally employed in the practice of the invention are used to bind transition metal cations that may be present in the ink. Examples of preferably-employed metal chelators include: EDTA, Diethylenetetraminepentaacetic acid (PTPA), trans-1,2-diaminocyclohexanetetraacetic acid (CDTA), (ethylenedioxy) diethylene dinitrilotetraacetic acid (EGTA), malonic acid, salicylic acid or other chelators that can bind transition metal cations. More preferably, EDTA, and DTPA, and most preferably, EDTA in its disodium salt form is employed in the practice of the invention.

The inks of the present invention optionally comprise 0 to about 1.5 wt % metal chelator. More preferably, the inks comprise from about 0.1 to about 0.5 wt % metal chelator, with a concentration from about 0.1 to about 0.3 wt % being the most preferred.

Biocides

Any of the biocides commonly employed in ink-jet inks may optionally be employed in the practice of the invention, such as Nuosept 95, available from Huls America (Piscataway, N.J.); Proxel GXL, available from Zeneca (Wilmington, Del.); and glutaraldehyde, available from Union Carbide Company (Bound Brook, N.J.) under the trade designation Ucarcide 250. Proxel GXL is the preferred biocide.

The inks of the present invention optionally comprise 0 to about 1.5 wt % biocide. More preferably, the inks comprise from about 0.1 to about 0.5 wt % biocide, with a concentration from about 0.1 to about 0.3 wt % being the most preferred.

All concentrations herein are in weight percent of total ink composition, unless otherwise indicated. The purity of all components is that employed in normal commercial practice for ink-jet inks.

EXAMPLES

Example 1

Inks containing custom synthesized dyes were underprinted with a protonated polyethyleneimine (PEI) containing fluid with $Ca^{2+}$. The underprinting fluid composition was:

| | |
|---|---|
| PEI (Lupasol FG from BASF) | 3.5% |
| Tetraethylene glycol | 6.0% |
| 2-pyrrolidinone | 4.0% |
| 1,5-pentanediol | 10.0% |
| Tergitol 15-S-5 | 1.25% |
| Bioterge PS-8S | 0.7% |
| $Ca(NO_3)_2.4\ H_2O$ | 3.5% |
| Tinulux BBS (14% solids) | 0.7% |
| Water | to 100% |
| pH adjusted to 4.0 with $HNO_3$. | |

The underprinting test was conducted in a 1:1 v/v regime, that is, 8 pL of fixer fluid to 8 pL of color ink (formulation given below) using an HP DeskJet 2000 printer.

| | |
|---|---|
| 1,5-pentanediol | 10.0% |
| 2-pyrrolidinone | 10.0% |
| Tergitol 15-S-5 | 1.5% |
| Dowfax 8390 | 1.0% |
| Binder* | 4.0% |
| Colorant** | 3–4% |
| Water | to 100% |
| pH adjusted to 8.0 with NaOH. | |

*the binders that were used were: none (water used for a blank, IV-1), the $Li^+$ salt of SMA-1000H (IV-2), the $Li^+$ salt of SMA-2000H (IV-3) and the $Li^+$ salt of SMA-3000H (IV-4). (Regarding the SMA-x000H, the number in front of the 000H designation depicts the ratio of styrene molecules to maleic anhydride molecules in the polymer. Hence, SMA-1000H has a 1:1 ratio of styrene to maleic anhydride whereas the SMA-3000H has a 3:1 styrene to maleic anhydride ratio.)
**colorant loads were as follows (structures of these dyes are given below):
C-1 (cyan)   4.0%
M-1 (magenta)   3.0%
Y-1 (yellow)   3.0%

Figure 2:
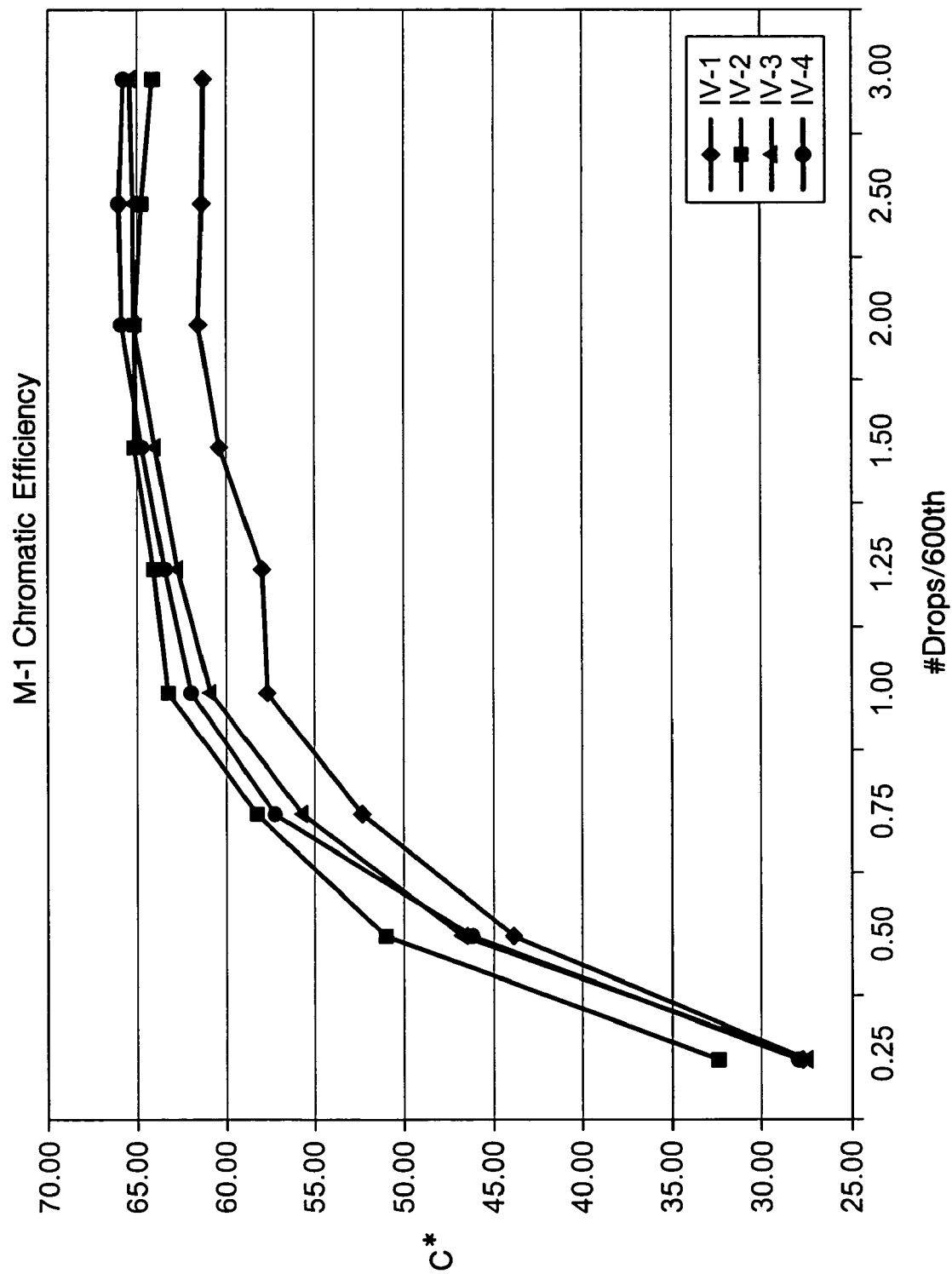
FIG. 2 is a graph comparing the interaction of the M-1 cyan ink of Example 1 (which contains the various binders) with the underprinting fluid. IV-1 contains the blank binder composition, IV-2 contains the SMA-1000H binder, IV-3 contains the SMA-2000H binder, and IV-4 contains the SMA-3000H binder.
Figure 3:
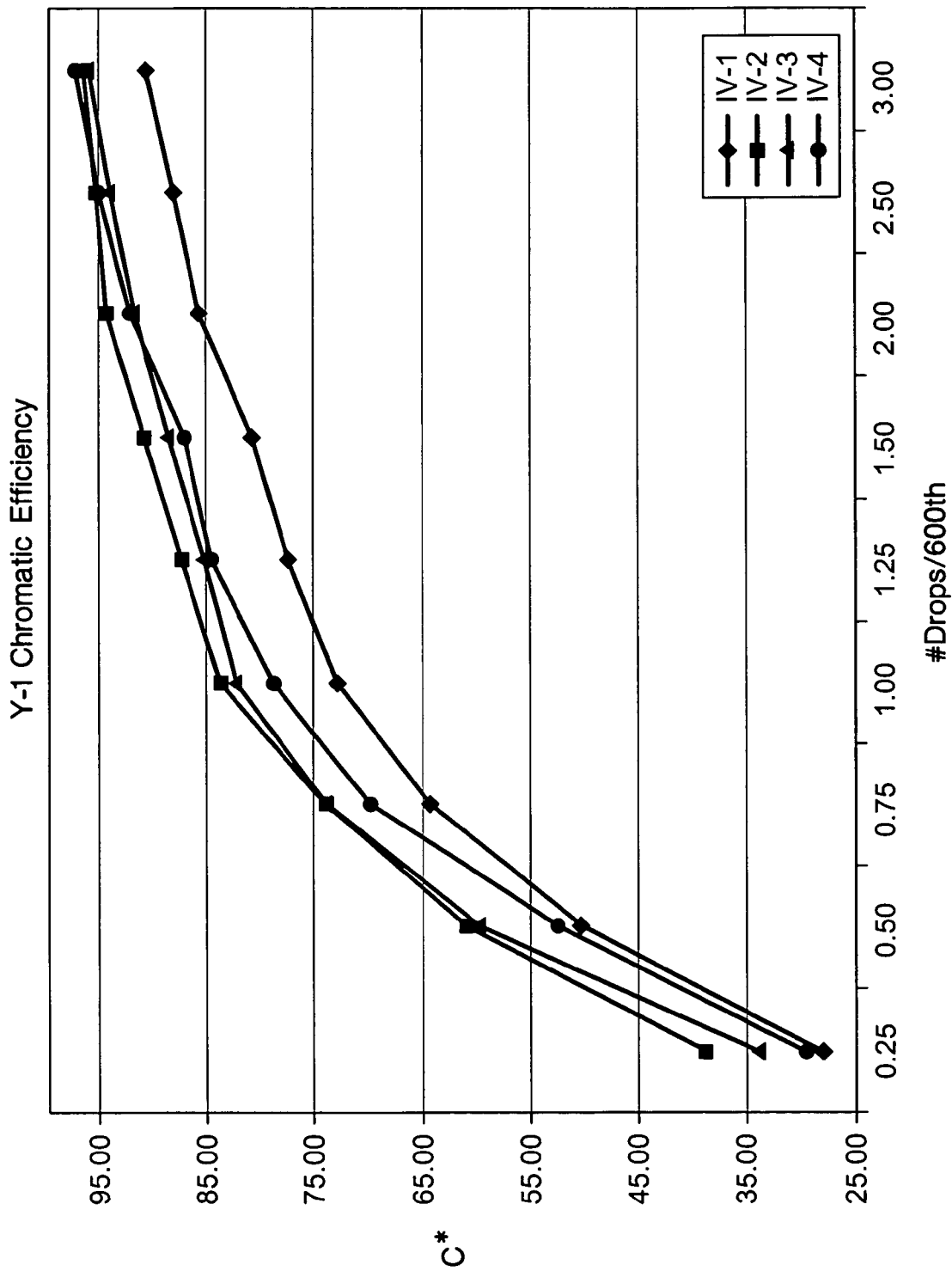
FIG. 3 is a graph comparing the interaction of the Y-1 cyan ink of Example 1 (which contains the various binders) with the underprinting fluid. IV-1 contains the blank binder composition, IV-2 contains the SMA-1000H binder, IV-3 contains the SMA-2000H binder, and IV-4 contains the SMA-3000H binder.

There was a chroma boost in all three colors when binder was used (when compared to the blank vehicle containing no binder, see FIGS. 1–3) with little or no change in the durability properties of the printed inks containing the binder vs. no binder. It should be mentioned that the PEI underprinting fluid did, in all cases, increase the waterfastness of the printed dyes—added binder did not significantly increase this property even more.

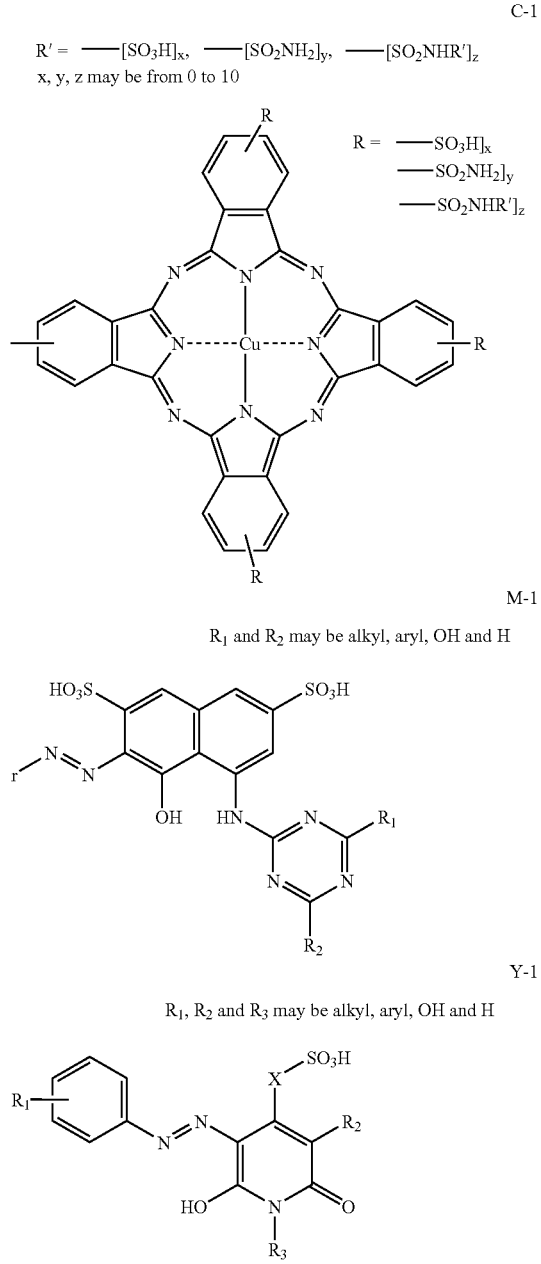

TABLE 1

Results for C-1, M-1 and Y-1 dyes (1.5 drops/600$^{th}$ primaries, 3 drops/600$^{th}$ secondaries, 4.5 drops/600$^{th}$ composite black)

| Color | IV-1 C*/OD | IV-2 C*/OD | IV-3 C*/OD | IV-4 C*/OD |
|---|---|---|---|---|
| Cyan | 42 | 46 | 47 | 46 |
| Magenta | 59 | 65 | 64 | 65 |
| Yellow | 80 | 91 | 89 | 88 |
| Red | 56 | 65 | 63 | 64 |
| Green | 50 | 55 | 55 | 58 |
| Blue | 38 | 42 | 43 | 44 |
| Black | 0.65 | 0.79 | 0.74 | 0.73 |

Note:
for the primary and secondary colors, chroma values are recorded. For the composite black, the measured optical density value is recorded.

Figure 4:
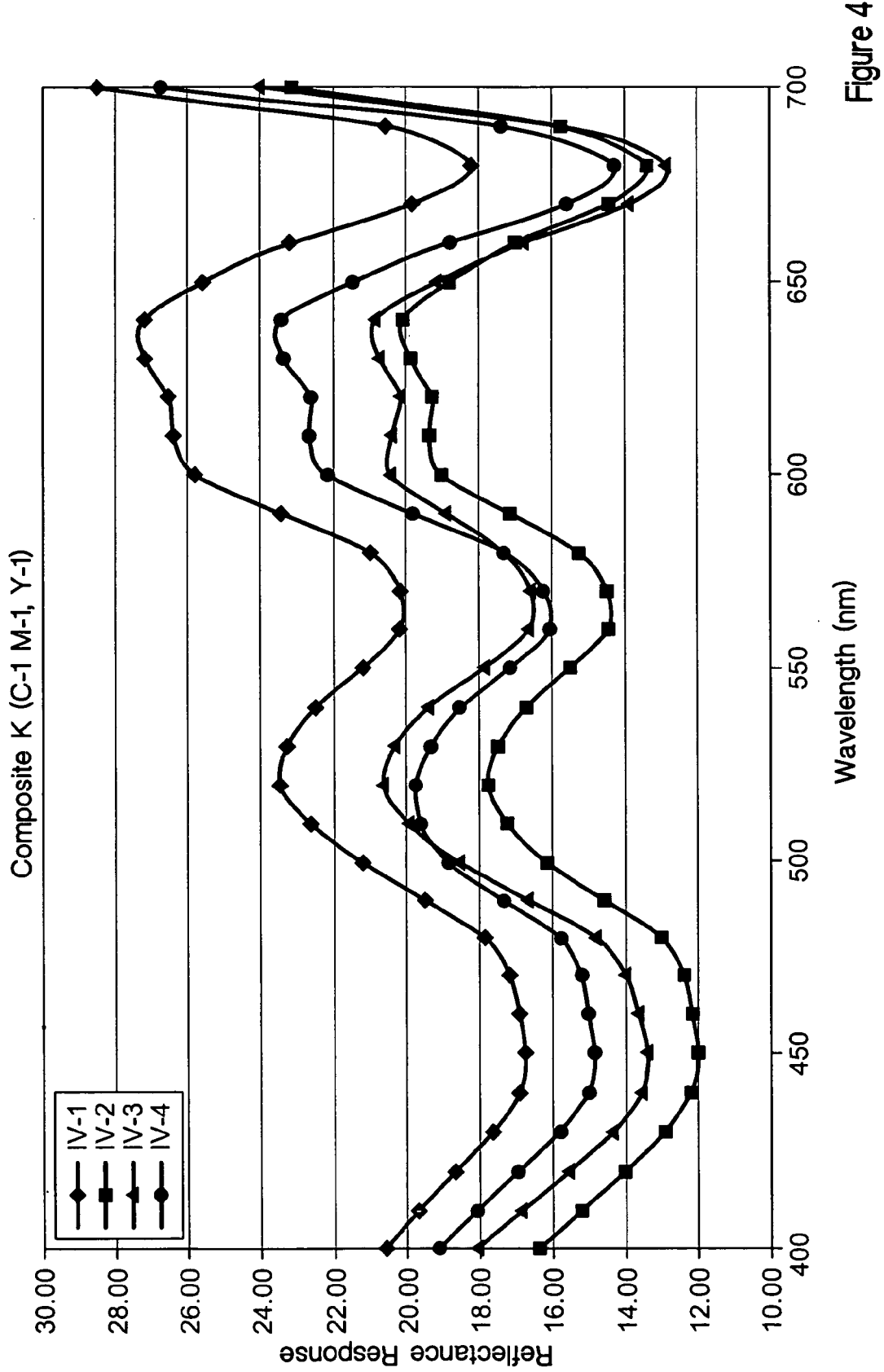
FIG. 4 is a graph comparing reflectance spectra of the C-1, M-1 and Y-1 ink spectra in a composite black matrix. IV-1 is a non-binder ink whereas IV-2 contains SMA-1000H, IV-3 contains SMA-2000H and IV-4 contains SMA-3000H binders. Note: the lower the values in the reflectance spectra, the greater the absorbance and more effective the coloration is.

As can be seen from Table 1 and FIG. 4, there is a large positive effect with the use of binders upon the secondary colors and the composite black.

Example 2

Inks containing custom synthesized dyes were underprinted with a protonated polyethyleneimine (PEI) containing fluid. The underprinting fluid composition was:

| | |
|---|---|
| PEI (MW 2,000 Aldrich) | 5.0% |
| 1,5-pentanediol | 10.0% |
| 2-pyrrolidinone | 5.0% |
| Proxel GXL | 0.2% |
| Tergitol 15-S-5 | 0.5% |
| Water | to 100% |
| pH adjusted to 4.0 with HNO$_3$. | |

The underprinting test was conducted in a 1:1 v/v regime, that is, 8 pL of fixer fluid to 8 pL of color ink (formulation given below) using an HP DeskJet 2000 printer.

| | |
|---|---|
| 1,5-pentanediol | 10.0% |
| 2-pyrrolidinone | 10.0% |
| Tergitol 15-S-5 | 1.5% |
| Dowfax 8390 | 1.0% |
| Binder* | 4.0% |
| Colorant** | 3–4% |
| Water | to 100% |
| pH adjusted to 8.0 with NaOH. | |

*the binders that were used were: none (water used for a blank, IV-1), the Li$^+$ salt of SMA-1000H (IV-2), the Li$^+$ salt of SMA-2000H (IV-3) and the Li$^+$ salt of SMA-3000H (IV-4).
**colorant loads were as follows:
C-1 (cyan)   4.0%
M-1 (magenta) 3.0%
Y-1 (yellow)  3.0%

Figure 5:
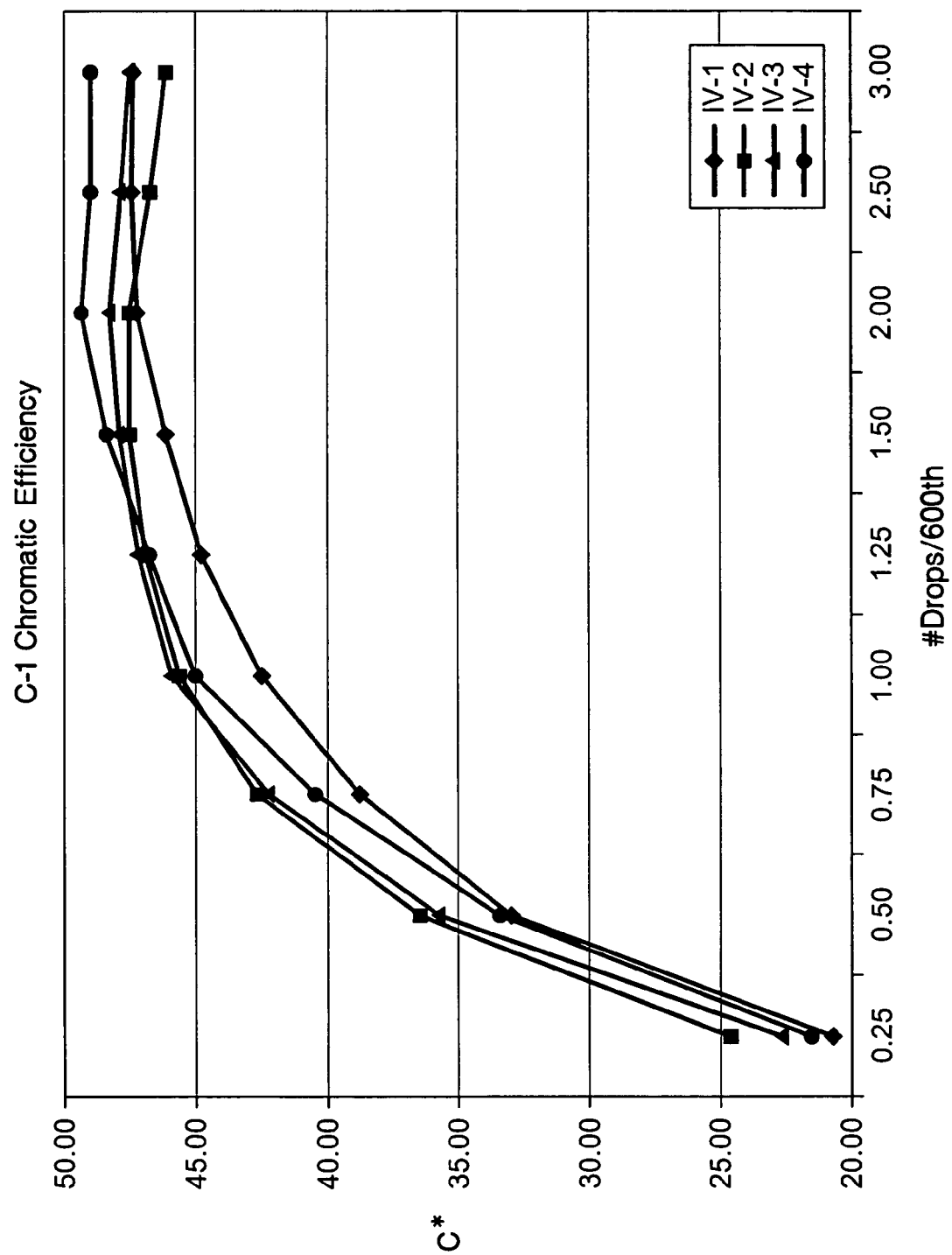
FIG. 5 is a graph comparing the interaction of the C-1 cyan ink of Example 2 (which contains the various binders) with the underprinting fluid. IV-1 contains the blank binder composition, IV-2 contains the SMA-1000H binder, IV-3 contains the SMA-2000H binder, and IV-4 contains the SMA-3000H binder.
Figure 6:
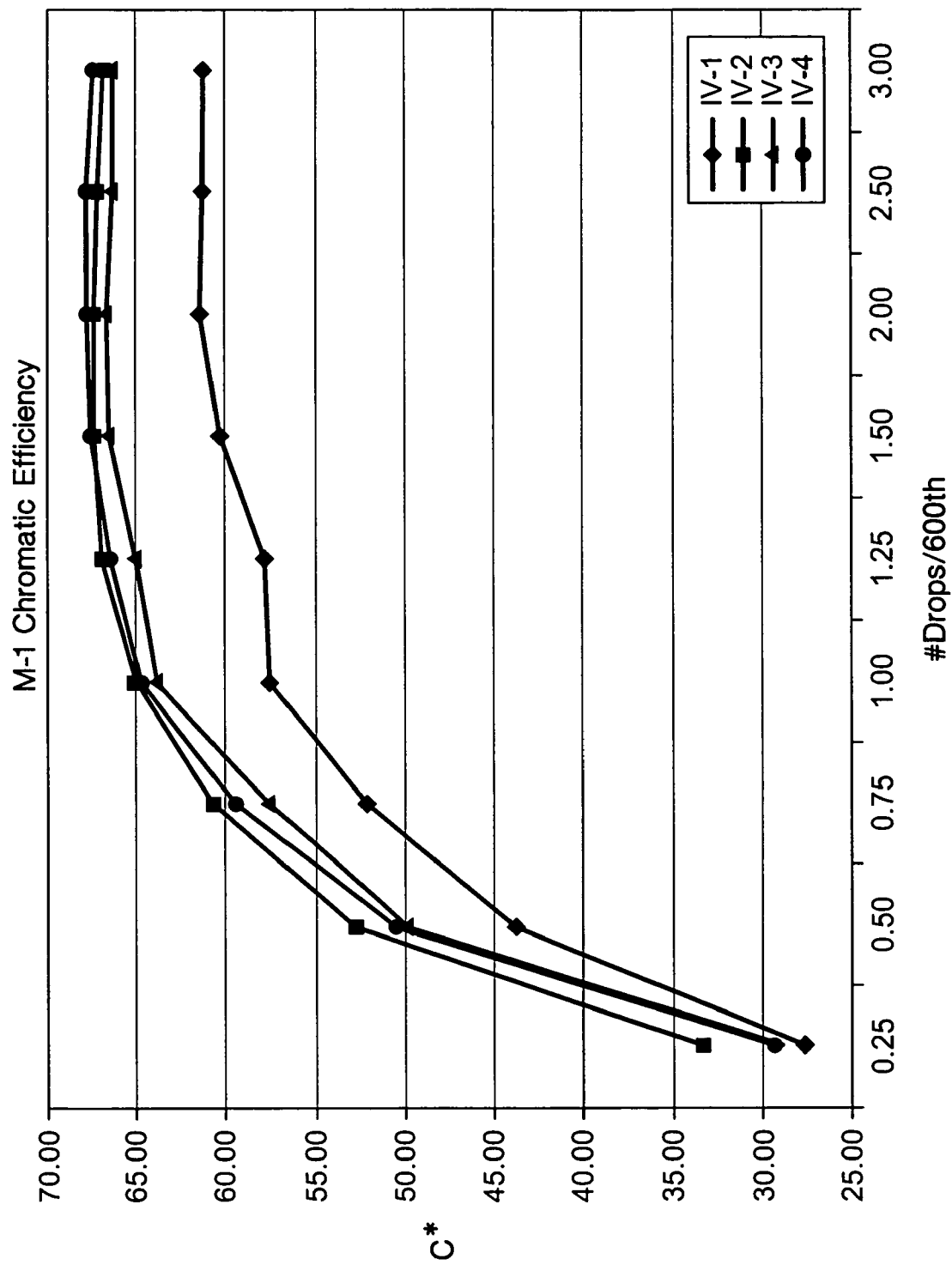
FIG. 6 is a graph comparing the interaction of the M-1 cyan ink of Example 2 (which contains the various binders) with the underprinting fluid. IV-1 contains the blank binder composition, IV-2 contains the SMA-1000H binder, IV-3 contains the SMA-2000H binder, and IV-4 contains the SMA-3000H binder.
Figure 7:
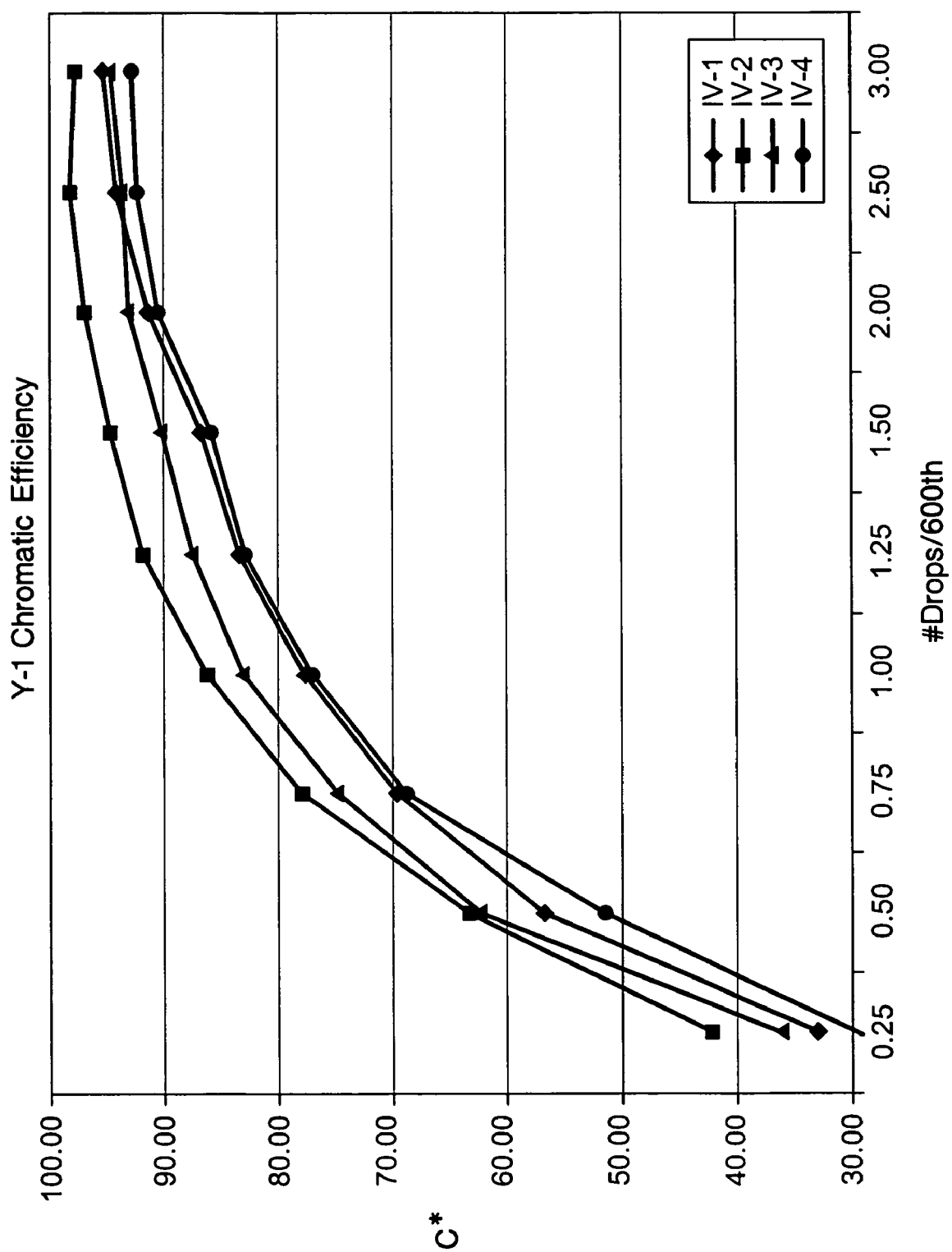
FIG. 7 is a graph comparing the interaction of the Y-1 cyan ink of Example 2 (which contains the various binders) with the underprinting fluid. IV-1 contains the blank binder composition, IV-2 contains the SMA-1000H binder, IV-3 contains the SMA-2000H binder, and IV-4 contains the SMA-3000H binder.

Except with higher print densities, there was a chroma boost in all three colors when binder was used (when compared to the blank vehicle containing no binder, see FIGS. 5–7) with little or no change in the durability properties of the printed inks containing the binder vs. no binder. It should be mentioned that the PEI underprinting fluid did, in all cases, increase the waterfastness of the printed dyes—added binder did not significantly increase this property even more.

TABLE 2

Results for C-1, M-1 and Y-1 dyes (1.5 drops/600th primaries, 3 drops/600th secondaries, 4.5 drops/600th composite black)

| Color | IV-1 C*/OD | IV-2 C*/OD | IV-3 C*/OD | IV-4 C*/OD |
|---|---|---|---|---|
| Cyan | 46 | 47 | 48 | 48 |
| Magenta | 64 | 68 | 66 | 68 |
| Yellow | 87 | 95 | 90 | 86 |
| Red | 63 | 67 | 64 | 65 |
| Green | 60 | 59 | 61 | 62 |
| Blue | 42 | 42 | 41 | 43 |
| Black | 0.72 | 0.82 | 0.77 | 0.76 |

Note:
for the primary and secondary colors, chroma values are recorded. For the composite black, the measured optical density value is recorded.

Figure 8:
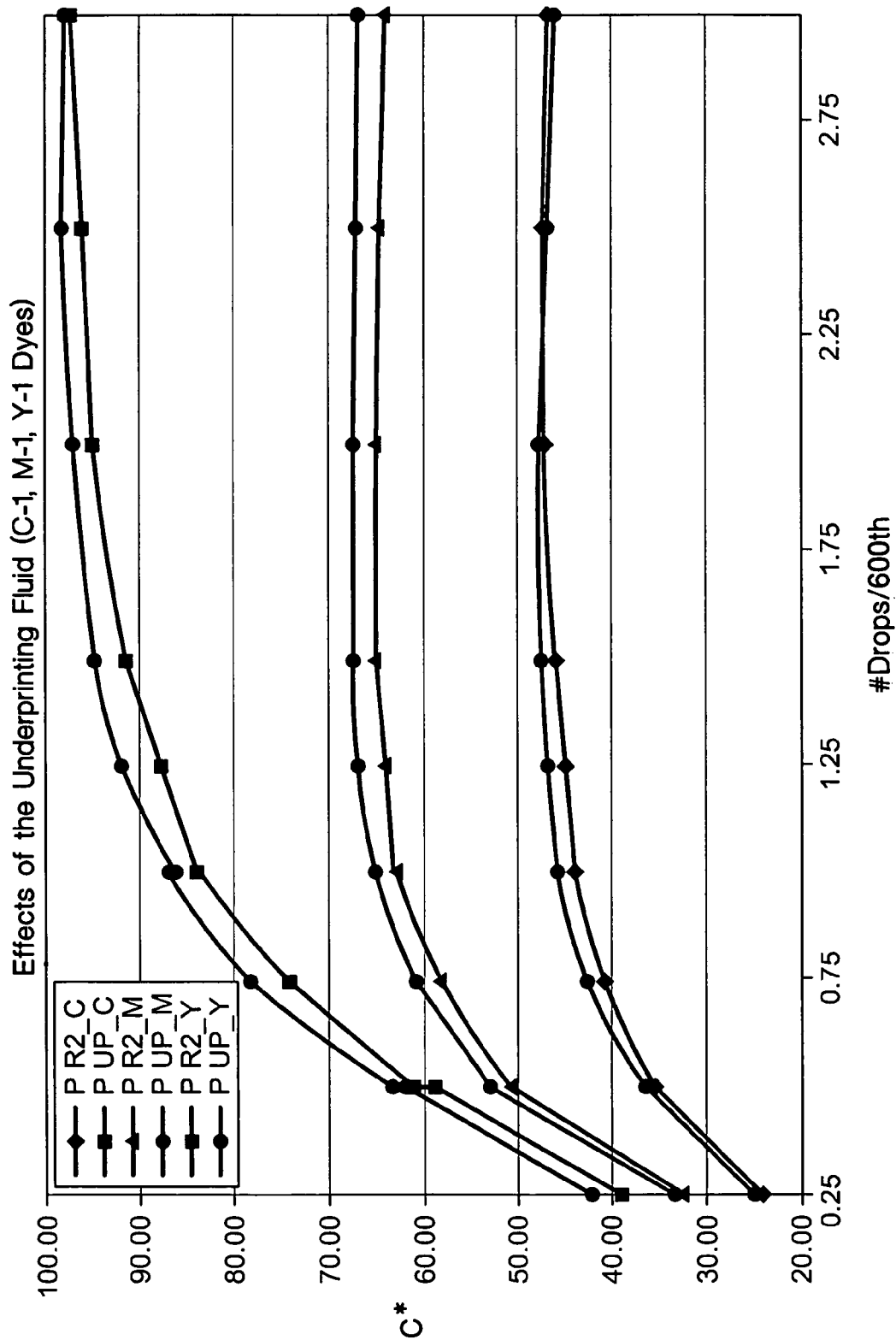
FIG. 8 is a graph comparing underprinting fluid used in Example 1 (P R2) and the underprinting fluid used in Example 2 (P UP). Because there is no use of Ca2+ in P UP, the effects of the interaction of the binder with the underprinting fluid are more pronounced

Although from initial observations the underprinting fluid used in Example 2 does not appear to enhance the color space as effectively as the underprinting fluid used in Example 1, it should be pointed out that there is no calcium ($Ca^{2+}$) salt used in the former underprinting fluid. The $Ca^{2+}$ salt helps to aggregate the dyes, thus reducing the effective color of the dyes, therefore, the use of an anionic binder in Example 1 is much more pronounced as it reduces the amount of aggregation that is caused by the $Ca^{2+}$ salt. A direct comparison of the two underprinting fluids and their effects on the color of the print is shown in FIG. 8.

Example 3

Inks containing custom synthesized dyes were underprinted with a protonated polyethyleneimine (PEI) containing fluid with $Ca^{2+}$. The underprinting fluid composition was:

| | |
|---|---|
| PEI (Lupasol FG from BASF) | 3.5% |
| Tetraethylene glycol | 6.0% |
| 2-pyrrolidinone | 4.0% |
| 1,5-pentanediol | 10.0% |
| Tergitol 15-S-5 | 1.25% |
| Bioterge PS-8S | 0.7% |
| Ca(NO₃)₂.4 H₂O | 3.5% |
| Tinulux BBS (14% solids) | 0.7% |
| Water | to 100% |
| pH adjusted to 4.0 with HNO₃. | |

The underprinting test was conducted in a 1:1 v/v regime, that is, 8 pL of fixer fluid to 8 pL of color ink (formulation given below) using an HP DeskJet 2000 printer.

| | |
|---|---|
| 1,5-pentanediol | 10.0% |
| 2-pyrrolidinone | 10.0% |
| Tergitol 15-S-5 | 1.5% |
| Dowfax 8390 | 1.0% |
| Binder* | 4.0% |
| Colorant** | 3–4% |
| Water | to 100% |
| pH adjusted to 8.0 with NaOH. | |

*the binders that were used were: none (water used for a blank, IV-1), the Li⁺ salt of SMA-1000H (IV-2), the Li⁺ salt of SMA-2000H (IV-3) and the Li⁺ salt of SMA-3000H (IV-4).
**colorant loads were as follows (the structures of the dyes are given below):
C-2 (cyan)     4.0%
M-2 (magenta)  3.0%
Y-2 (yellow)   3.0%

There was very little chroma boost with the cyan and magenta dyes when using a binder. The reason there is little boost is hypothesized to be due to the fact that the cyan and magenta dyes are carboxylated, making the interaction of the dye with the underprinting fluid occur on the same time scale as the interaction of the binder with the underprinting fluid. Because of the kinetics of interaction, there will be no boost since the binder/underprinting fluid interaction occurs no faster than the dye/underprinting fluid interaction. Although waterfastness of the printed material occurs when using PEI as an underprinting fluid, there was little to no change in the durability properties of the printed inks that contained binder vs. the printed inks that did not contain binder (IV-1).

Figure 9:
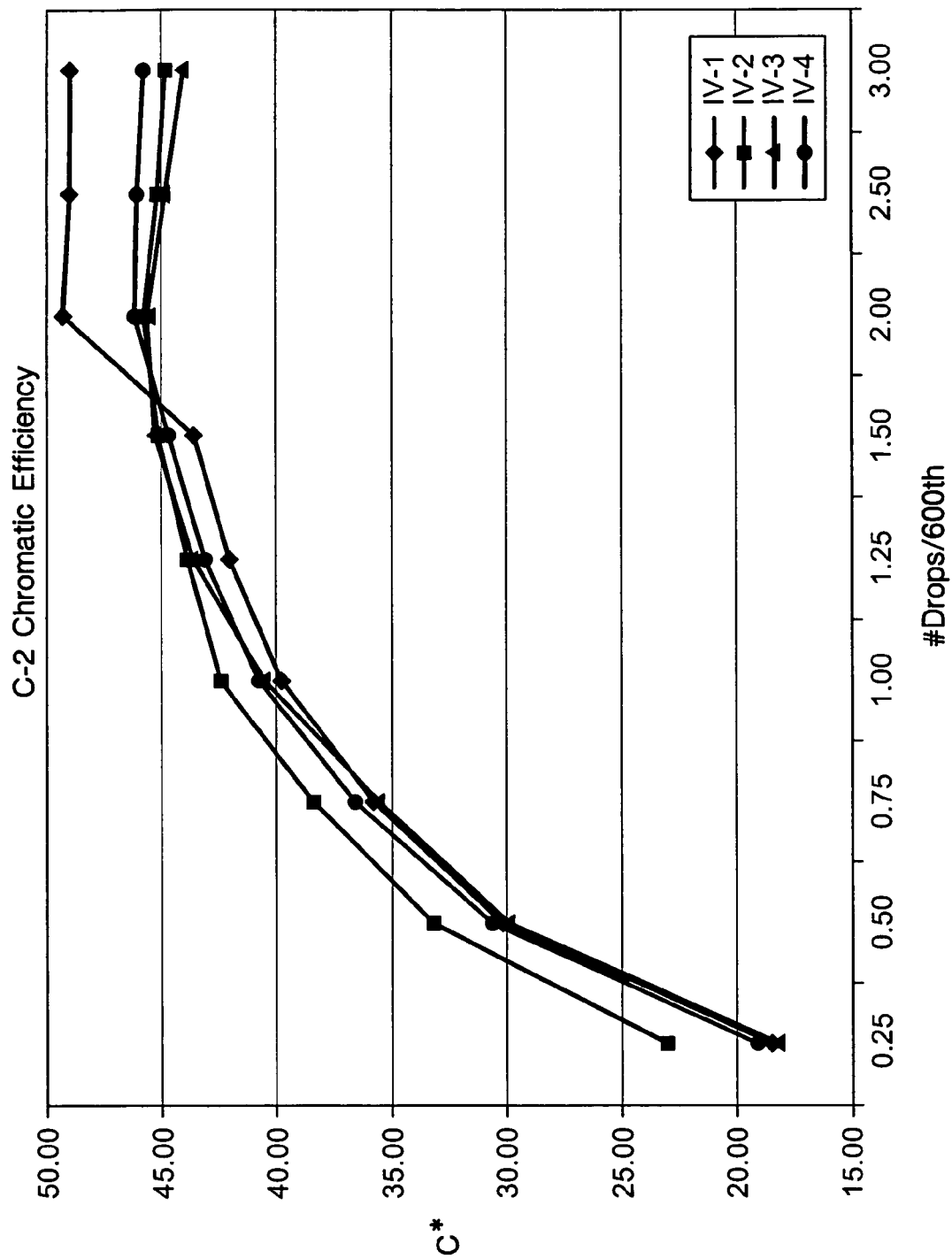
FIG. 9 is a graph comparing the interaction of the C-2 cyan ink of Example 3 (which contains the various binders) with the underprinting fluid. IV-1 contains the blank binder composition, IV-2 contains the SMA-1000H binder, IV-3 contains the SMA-2000H binder, and IV-4 contains the SMA-3000H binder.
Figure 10:
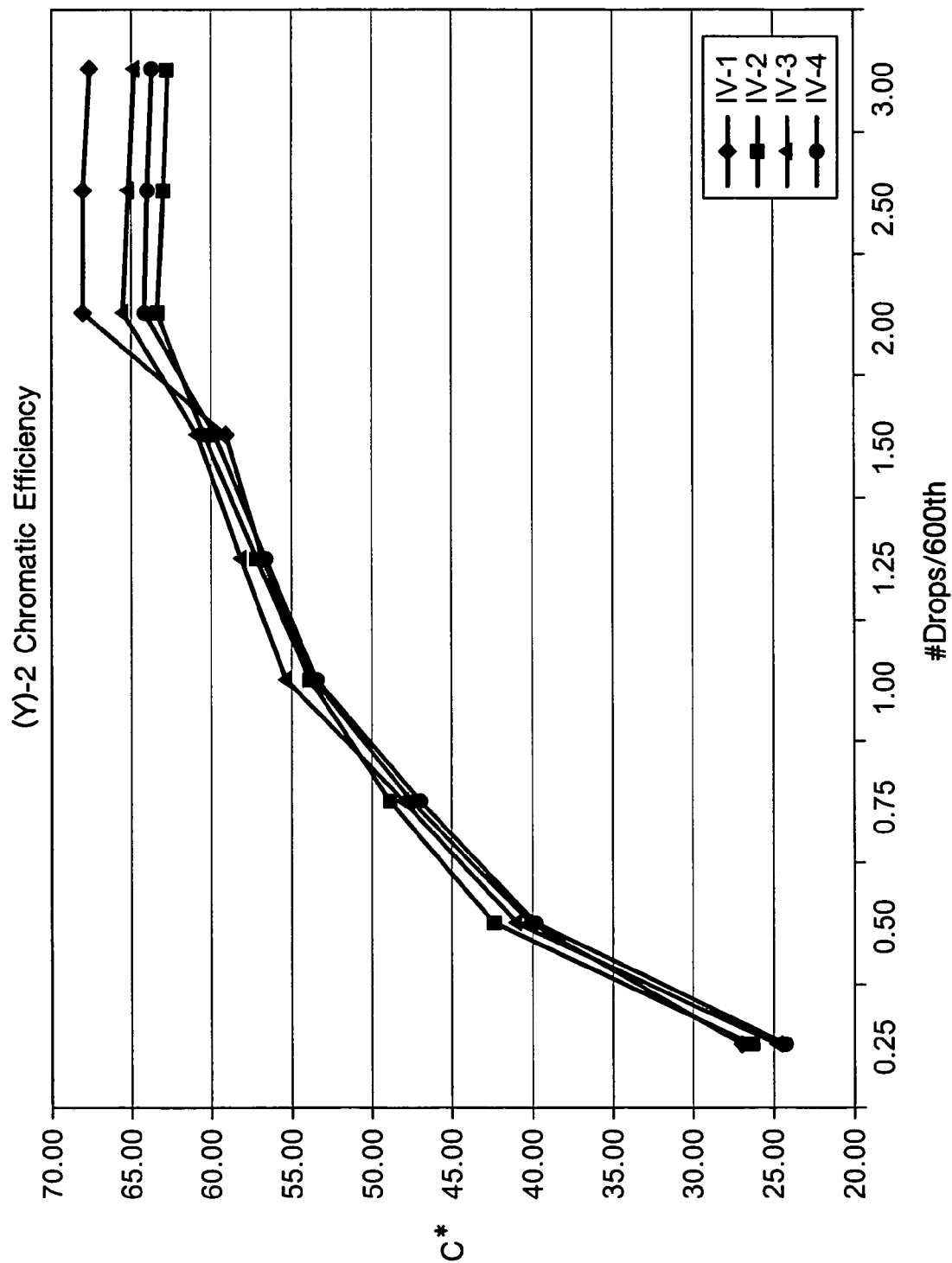
FIG. 10 is a graph comparing the interaction of the M-2 cyan ink of Example 3 (which contains the various binders) with the underprinting fluid. IV-1 contains the blank binder composition, IV-2 contains the SMA-1000H binder, IV-3 contains the SMA-2000H binder, and IV-4 contains the SMA-3000H binder.
Figure 11:
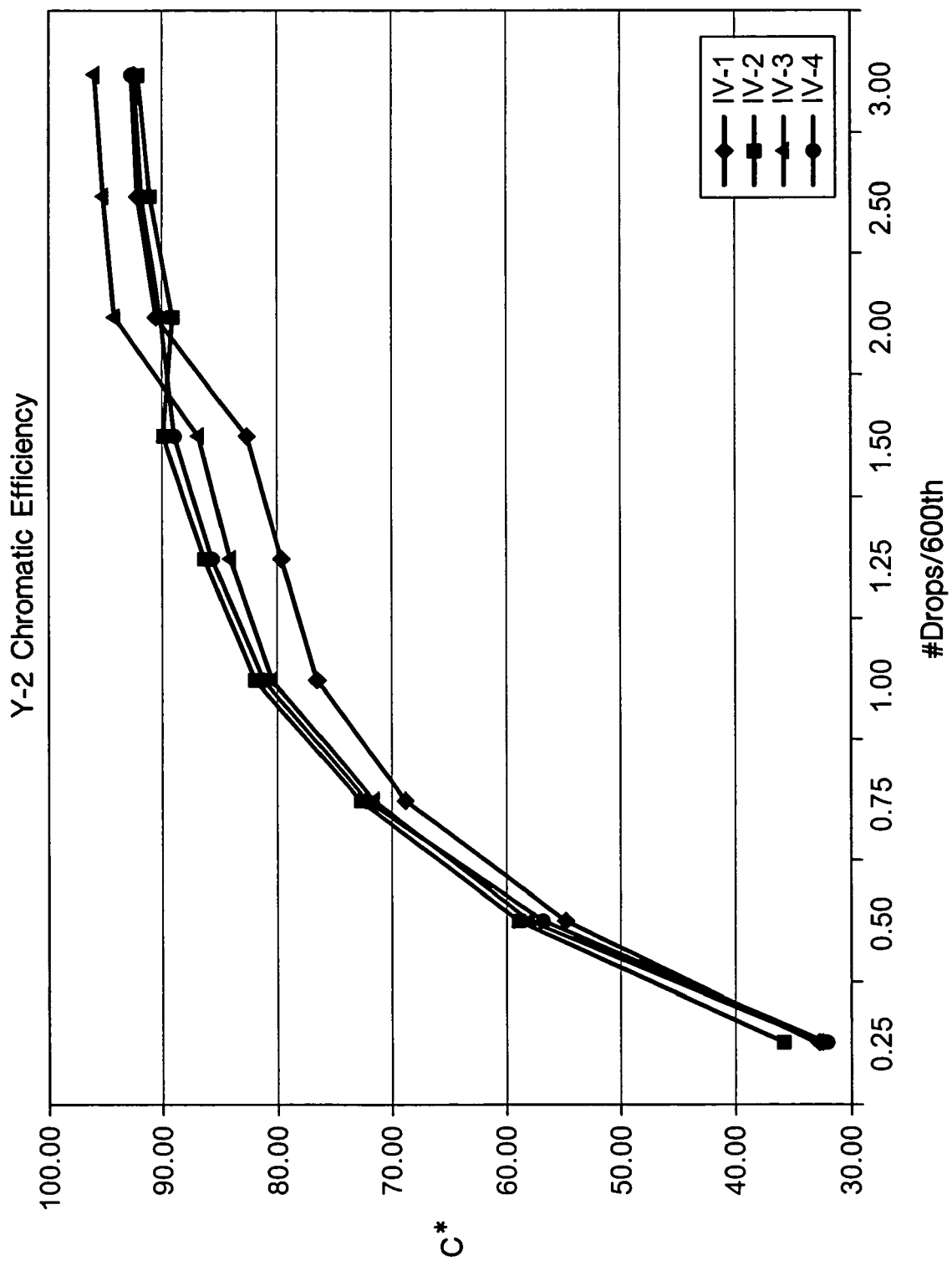
FIG. 11 is a graph comparing the interaction of the Y-2 cyan ink of Example 3 (which contains the various binders) with the underprinting fluid. IV-1 contains the blank binder composition, IV-2 contains the SMA-1000H binder, IV-3 contains the SMA-2000H binder, and IV-4 contains the SMA-3000H binder.

There is an increase in the chroma of the printed yellow dye (the Y-2) which is not a carboxylated dye. Figures of the interaction of the binder containing inks for each colorant are given in FIGS. 9–11.

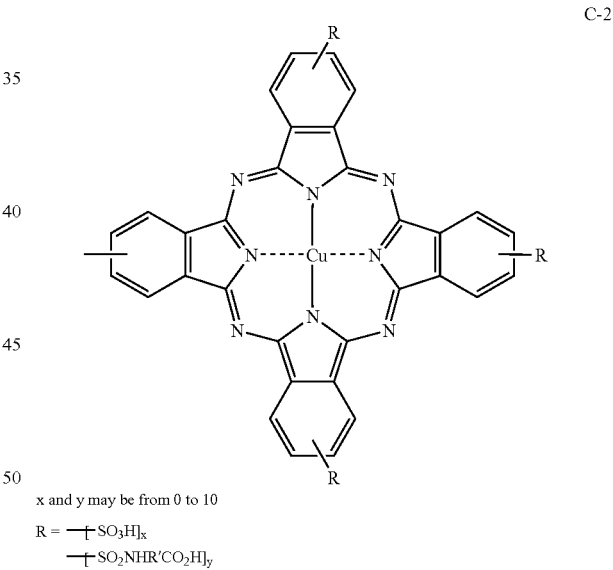

C-2 x and y may be from 0 to 10

R = ─(SO₃H)ₓ
    ─(SO₂NHR'CO₂H)ᵧ

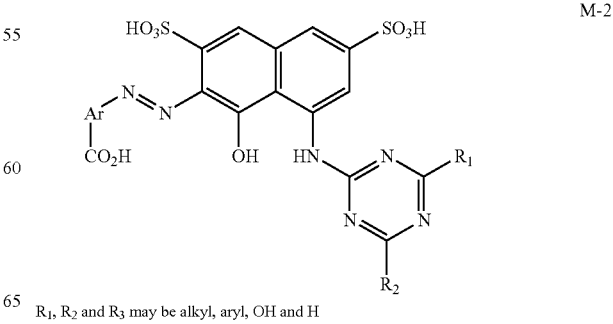

M-2

$R_1$, $R_2$ and $R_3$ may be alkyl, aryl, OH and H

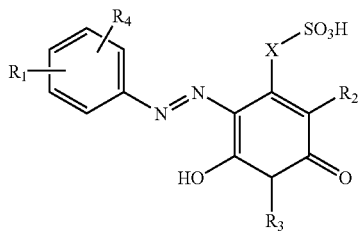

Y-2

R1, R2, R3, and R4 may be alkyl, aryl, OH and H.
X may be a halide.

R1, R2, R3, and R4 may be alkyl, aryl, OH and H.

X may be a halide.

Figure 12:
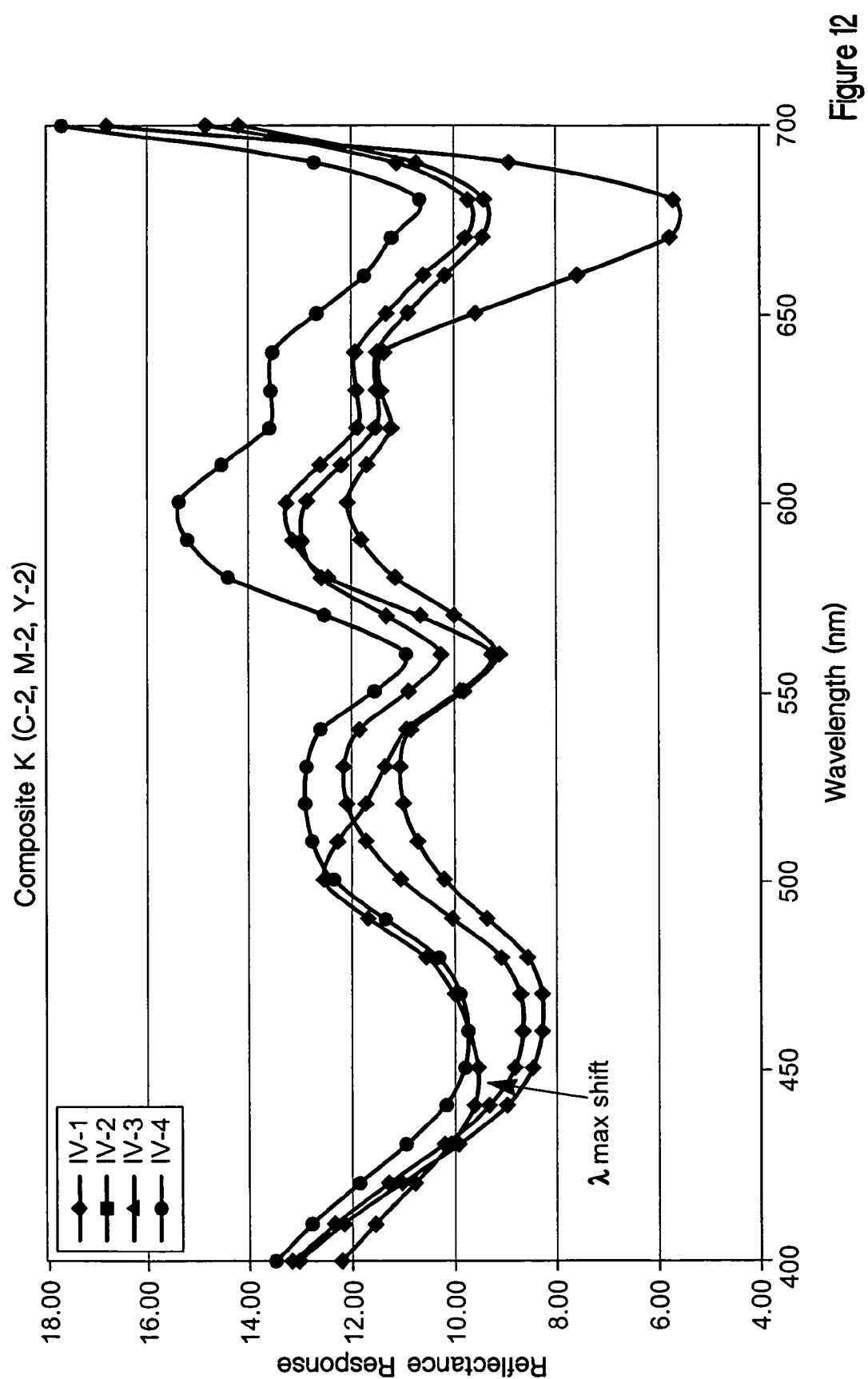
FIG. 12 is a graph comparing reflectance spectra of the C-2, M-2 and Y-2 ink spectra in a composite black matrix. IV-1 is a non-binder ink whereas IV-2 contains SMA-1000H, IV-3 contains SMA-2000H and IV-4 contains SMA-3000H binders. Note: the lower the values in the reflectance spectra, the greater the absorbance and more effective the coloration is.
Figure 13:
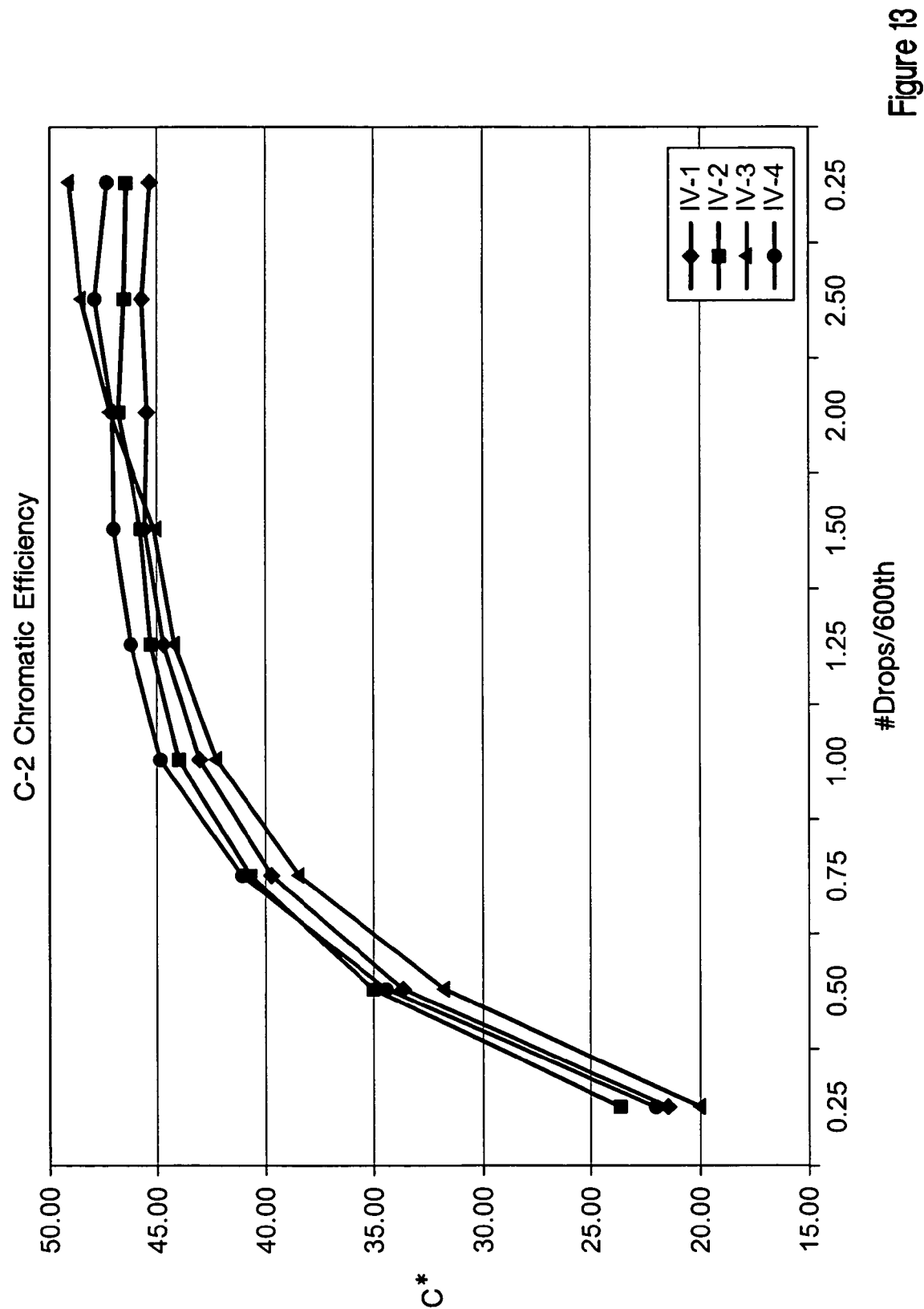
FIG. 13 is a graph comparing the interaction of the C-2 cyan ink of Example 4 (which contains the various binders) with the underprinting fluid. IV-1 contains the blank binder composition, IV-2 contains the SMA-1000H binder, IV-3 contains the SMA-2000H binder, and IV-4 contains the SMA-3000H binder.
Figure 14:
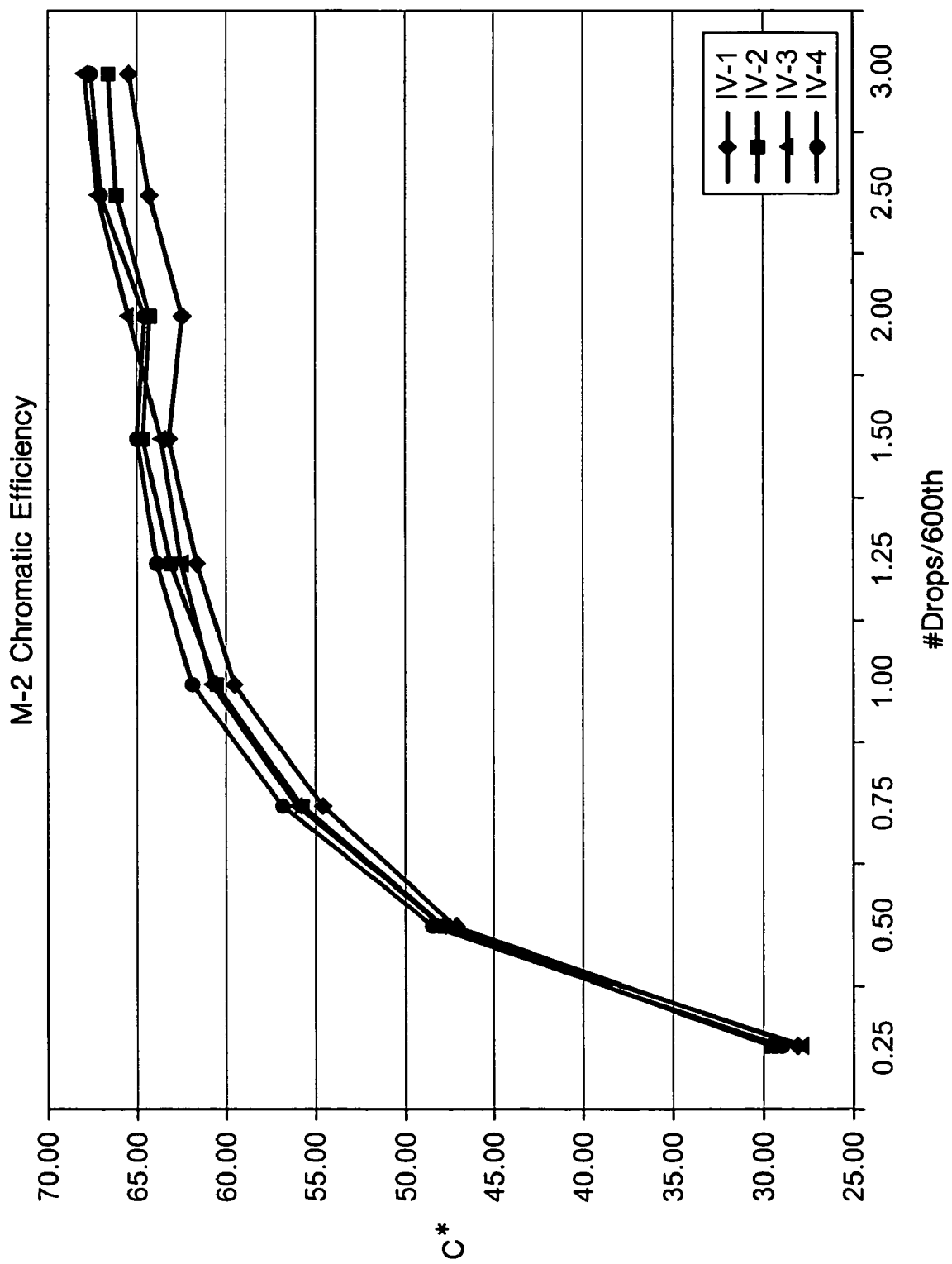
FIG. 14 is a graph comparing the interaction of the M-2 cyan ink of Example 4 (which contains the various binders) with the underprinting fluid. IV-1 contains the blank binder composition, IV-2 contains the SMA-1000H binder, IV-3 contains the SMA-2000H binder, and IV-4 contains the SMA-3000H binder.
Figure 15:
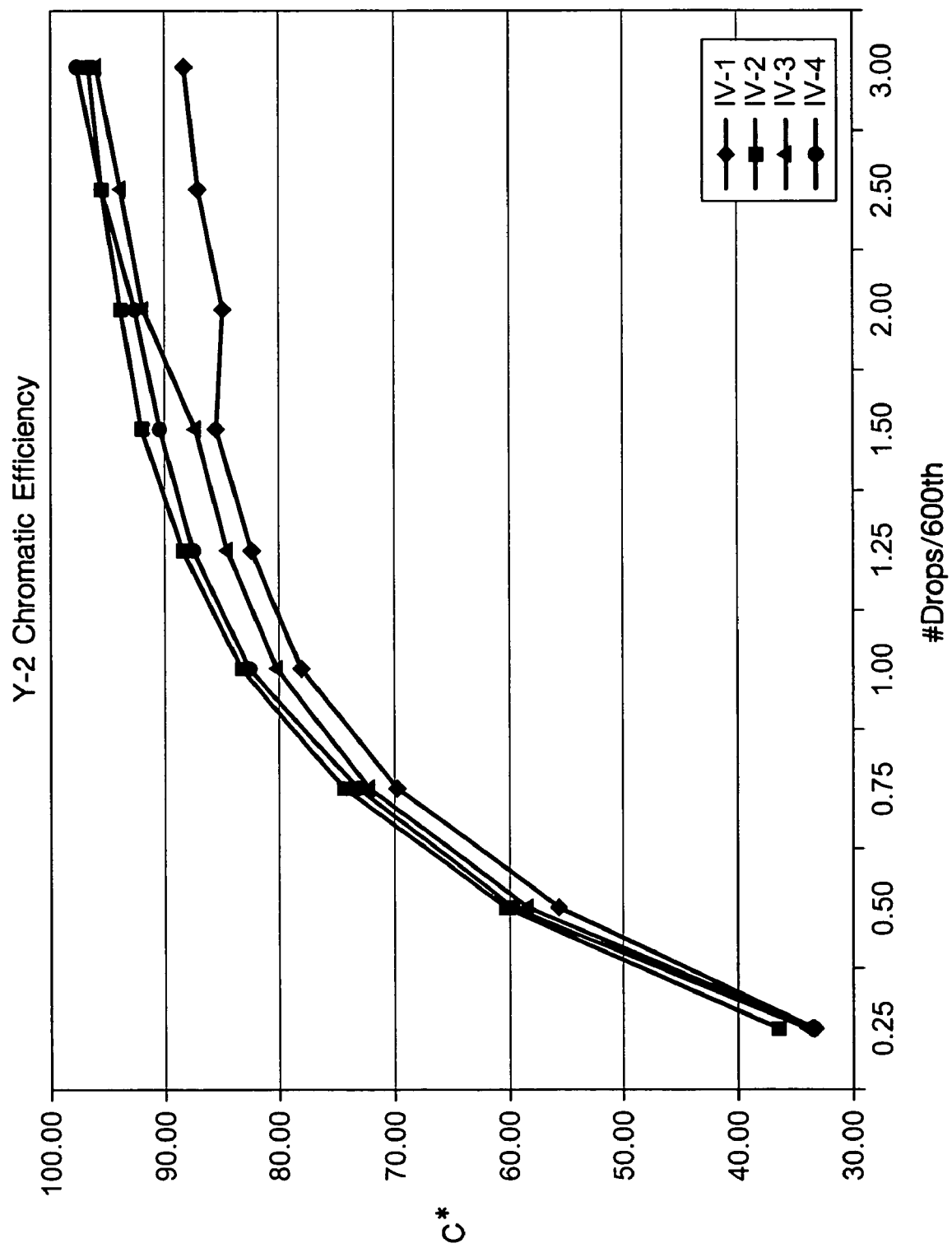
FIG. 15 is a graph comparing the interaction of the Y-2 cyan ink of Example 4 (which contains the various binders) with the underprinting fluid. IV-1 contains the blank binder composition, IV-2 contains the SMA-1000H binder, IV-3 contains the SMA-2000H binder, and IV-4 contains the SMA-3000H binder.

Examination of the data in Table 3 and the graph of the composite black in FIG. 12 show that the yellow dye indeed has its chroma enhanced with the addition of binder to its ink vehicle composition. However, the cyan and magenta dyes do not. Again, this is presumably because of the carboxyl substituent on the cyan and magenta dyes that interact with the underprinting fluid on the same time scale as the binder. This competitive interaction prohibits the beneficial chroma enhancement that is seen with non-carboxylated dyes.

TABLE 3

Results for C-2, M-2 and Y-2 dyes (1.5 drops/600$^{th}$ primaries, 3 drops/600$^{th}$ secondaries, 4.5 drops/600$^{th}$ composite black)

| Color | IV-1 C*/OD | IV-2 C*/OD | IV-3 C*/OD | IV-4 C*/OD |
|---|---|---|---|---|
| Cyan | 49 | 45 | 44 | 46 |
| Magenta | 68 | 63 | 65 | 64 |
| Yellow | 93 | 92 | 96 | 93 |
| Red | 65 | 60 | 65 | 62 |
| Green | 58 | 49 | 47 | 52 |
| Blue | 41 | 38 | 39 | 38 |
| Black | 0.98 | 0.94 | 0.96 | 0.89 |

Note:
for the primary and secondary colors, chroma values are recorded. For the composite black, the measured optical density value is recorded.

Example 4

Inks containing custom synthesized dyes were underprinted with a protonated polyethyleneimine (PEI) containing fluid. The underprinting fluid composition was:

| PEI (MW 2,000 Aldrich) | 5.0% |
|---|---|
| 1,5-pentanediol | 10.0% |
| 2-pyrrolidinone | 5.0% |
| Proxel GXL | 0.2% |
| Tergitol 15-S-5 | 0.5% |
| Water | to 100% |
| pH adjusted to 4.0 with HNO$_3$. | |

The underprinting test was conducted in a 1:1 v/v regime, that is, 8 pL of fixer fluid to 8 pL of color ink (formulation given below) using an HP DeskJet 2000 printer.

| 1,5-pentanediol | 10.0% |
|---|---|
| 2-pyrrolidinone | 10.0% |
| Tergitol 15-S-5 | 1.5% |
| Dowfax 8390 | 1.0% |
| Binder* | 4.0% |
| Colorant** | 3–4% |
| Water | to 100% |
| pH adjusted to 8.0 with NaOH. | |

*the binders that were used were: none (water used for a blank, IV-1), the Li$^+$ salt of SMA-1000H (IV-2), the Li$^+$ salt of SMA-2000H (IV-3) and the Li$^+$ salt of SMA-3000H (IV-4).
**colorant loads were as follows:

| C-2 (cyan) | 4.0% |
|---|---|
| M-2 (magenta) | 3.0% |
| Y-2 (yellow) | 3.0% |

As in Example 3, there was very little chroma boost with the cyan and magenta dyes when using a binder.

There is an increase in the chroma of the printed yellow dye (Y-2) which is not a carboxylated dye. Figures of the interaction of the binder containing inks for each colorant are given in FIGS. 9–11.

TABLE 4

Results for C-2, M-2 and Y-2 dyes (1.5 drops/600$^{th}$ primaries, 3 drops/600$^{th}$ secondaries, 4.5 drops/600$^{th}$ composite black)

| Color | IV-1 C*/OD | IV-2 C*/OD | IV-3 C*/OD | IV-4 C*/OD |
|---|---|---|---|---|
| Cyan | 45 | 47 | 49 | 47 |
| Magenta | 65 | 66 | 68 | 67 |
| Yellow | 89 | 97 | 96 | 98 |
| Red | 69 | 72 | 71 | 72 |
| Green | 41 | 46 | 50 | 48 |
| Blue | 37 | 36 | 41 | 37 |
| Black | 0.94 | 0.99 | 0.92 | 0.98 |

Note:
for the primary and secondary colors, chroma values are recorded. For the composite black, the measured optical density value is recorded.

Example 5

Experiments were performed to test the effect of underprinted "fixer fluids" on various aqueous inks. A non-limiting example of a composition of a fixer fluid is: 5% 2-pyrrolidone; 8% 1,5 pentanediol; 0.45% Tergitol 15S-7; 2% Polyethyleneimide (PEI)(Lupasol FG or Lupasol G20WF (water free), registered trademarks of BASF); 2% Ca(NO$_3$)$_2$·4H$_2$O; Balance of Water up to 100%.

One of several such "fixer fluids" was underprinted on a specific pixel location of a paper, then one of several different conventional aqueous inks were printed on the previously underprinted pixel locations. As a control, aqueous inks were also printed on pixel locations without underprinted "fixer fluid". The chroma of the colored printed images and the optical density of the black printed images were measured. Results were collected into the Tables given below for Magentas, Reds (Magenta & Yellow), Cyans, Greens (Cyan & Yellow) and Blacks, respectively. (The Black dye used was a combination of Pro-Jet Black 286 and Pro-Jet Black 287, registered trademarks of Avecia).

| Dye Binder | Dye | Fixers | Chroma |
|---|---|---|---|
| MAGENTAS | | | |
| None | AR52 | None | 71 |
| SMA 1000H | AR52 | None | 71 |
| None | AR52 | Aluminum | 61 |
| SMA 1000H | AR52 | Aluminum | 75 |
| None | AR52 | Calcium | 62 |
| SMA 1000H | AR52 | Calcium | 75 |
| None | AR52 | PEI-(Lupasol G20WF) | 68 |
| SMA 1000H | AR52 | PEI-(Lupasol G20WF) | 74 |
| None | M 377 | None | 51 |
| SMA 1000H | M 377 | None | 52 |
| None | M 377 | Aluminum | 45 |
| SMA 1000H | M 377 | Aluminum | 55 |
| None | M 377 | Calcium | 46 |
| SMA 1000H | M 377 | Calcium | 55 |
| None | M 377 | PEI-(Lupasol G20WF) | 45 |
| SMA 1000H | M377 | PEI-(Lupasol G20WF) | 51 |
| REDS (MAGENTAS + YELLOW) | | | |
| None | AR52 + DY132 | None | 51 |
| SMA 1000H | AR52 + DY132 | None | 51 |
| None | AR52 + DY132 | Aluminum | 52 |
| SMA 1000H | AR52 + DY132 | Aluminum | 62 |
| None | AR52 + DY132 | Calcium | 50 |
| SMA 1000H | AR52 + DY132 | Calcium | 60 |
| None | AR52 + DY132 | PEI-(Lupasol G20WF) | 51 |
| SMA 1000H | AR52 + DY132 | PEI-(Lupasol G20WF) | 55 |
| None | M377 + DY132 | None | 47 |
| SMA 1000H | M377 + DY132 | None | 47 |
| None | M377 + 0Y132 | Aluminum | 54 |
| SMA 1000H | M377 + DY132 | Aluminum | 58 |
| None | M377 + DY132 | Calcium | 52 |
| SMA 1000H | M377 + DY132 | Calcium | 58 |
| None | M377 + DY132 | PEI-(Lupasol G20WF) | 49 |
| SMA 1000H | M377 + DY132 | PEI-(Lupasol G20WF) | 60 |
| CYAN | | | |
| None | AB9 | None | 50 |
| SMA 1000H | AB9 | None | 51 |
| None | AB9 | Aluminum | 46 |
| SMA 1000H | AB9 | Aluminum | 52 |
| None | AB9 | Calcium | 46 |
| SMA 1000H | AB9 | Calcium | 49 |
| None | AB9 | PEI-(Lupasol G20WF) | 48 |
| SMA 1000H | AB9 | PEI-(Lupasol G20WF) | 52 |
| Green (Cyan + Yellow) | | | |
| None | AB9 + DY132 | None | 52 |
| SMA 1000H | AB9 + DY132 | None | 51 |
| None | AB9 + DY132 | Aluminum | 55 |
| SMA 1000H | AB9 + DY132 | Aluminum | 58 |
| None | AB9 + DY132 | Calcium | 53 |
| SMA 1000H | AB9 + DY132 | Calcium | 47 |
| None | AB9 + DY132 | PEI-(Lupasol G20WF) | 50 |
| SMA 1000H | AB9 + DY132 | PEI-(Lupasol G20WF) | 55 |
| BLACKS | | | |
| None | Pro-Jet Black 286/ Pro-Jet Black 287 | None | 0.88 |
| SMA 1000H | Pro-Jet Black 286/ Pro-Jet Black 287 | None | 0.98 |
| None | Pro-Jet Black 286/ Pro-Jet Black 287 | Calcium | 0.81 |
| SMA 1000H | Pro-Jet Black 286/ Pro-Jet Black 287 | Calcium | 1.01 |
| None | Pro-Jet Black 286/ Pro-Jet Black 287 | PEI-(Lupasol FG) | 0.88 |
| SMA 1000H | Pro-Jet Black 286/ Pro-Jet Black 287 | PEI-(Lupasol FG) | 1.04 |

While the foregoing invention has been described in some detail for purposes of clarity and understanding, it will be clear to one skilled in the art from the reading of this disclosure that various changes in form and detail can be made without departing from the true scope of the invention.

What is claimed is:

1. An ink-jet printing apparatus, comprising:
   a printhead portion including an underprinting fixer fluid comprising a cationic polymer and a printhead portion including an ink composition comprising an anionic component, the anionic component comprising a water-soluble anionic binder and a water-soluble dye, the anionic binder comprising polymers having a complexing group, the complexing group being selected from the group consisting of Ethylene Diamine Tetraacetic Acid, Acetyl Acetonate Maleic Anhydride, an Acrylate and combinations thereof;
   wherein the cationic polymer is a polyelectrolyte selected from the group consisting of $R_1R_2R_3R_4N^+$; $R_1R_2R_3R_4P^+$ and $R_1R_2R_3R_4As^+$, and where R is H, alkyl or other organic substituent, and where the weight average molecular weight of the polyelectrolyte is from 2000 up to 10,000
   and wherein the cationic polymer is in solution with non-polymeric cations selected from the group consisting of calcium ions, aluminum ions, barium ions, strontium ions, zinc ions, magnesium ions and titanium ions;
   and wherein, when the ink composition is printed on a medium over the fixer fluid printed on the medium, the ink composition and fixer fluid together form an amorphous viscous fluid, the viscous fluid having a viscosity greater than the ink composition.

2. The apparatus of claim 1, wherein the anionic binder comprises styrene.

3. The apparatus of claim 1, wherein the anionic binder comprises hydrolyzed styrene maleic anhydride.

4. The apparatus of claim 1, wherein the dye in the anionic component has anionic functional groups.

5. The apparatus of claim 4, wherein the dyes having anionic functional groups is selected from the group consisting of sulfonated dyes with non-polar groups, dyes with protonatable groups, dyes with carboxylate groups and dyes with phosphonate groups.

6. The apparatus of claim 1, wherein the ink composition further comprises low-molecular weight hydrophilic compounds.

7. The apparatus of claim 6, wherein the low-molecular weight hydrophilic compounds are selected from the group consisting of inorganic salts and lower alcohols.

8. The apparatus of claim 1, wherein the polyelectrolyte comprises branched or linear polymer chains.

9. The apparatus of claim 1, wherein the cationic polymers is tetrasubstituted ammonium salts.

10. A method of ink-jet printing, the method comprising the steps of:
   a) ejecting at a location on a medium an underprinting fixer fluid comprising at least one cationic polymer;
   b) ejecting at the location on the medium an ink composition comprising at least one anionic component;
   the anionic component comprising a water-soluble anionic binder and a water-soluble dye, the anionic binder comprising polymers having a complexing group, the complexing group being selected from the group consisting of Ethylene Diamine Tetraacetic Acid, Acetyl Acetonate Maleic Anhydride, an Acrylate and combinations thereof;
wherein the cationic polymer is a polyelectrolyte selected from the group is consisting of $R_1R_2R_3R_4N^+$, $R_1R_2R_3R_4P^+$ and $R_1R_2R_3R_4As^+$, and
where R is H, alkyl or other organic substituent, and where the weight averaae molecular weight of the polyelectrolyte is from 2000 up to 10,000;
and wherein the cationic polymer is in solution with non-polymeric cations selected from the group consisting of calcium ions, aluminum ions, barium ions, strontium ions, zinc ions, magnesium ions and titanium ions;
and wherein the ink composition and the fixer fluid together form an amorphous viscous fluid, the viscous fluid having a viscosity greater than the ink composition.

11. The method of claim 10, wherein the anionic binder comprises styrene.

12. The method of claim 10, wherein the anionic binder comprises hydrolyzed styrene maleic anhydride.

13. The method of claim 10, wherein the dye in the anionic component has anionic functional groups.

14. The method of claim 13, wherein the dyes having anionic functional groups is selected from the group consisting of sulfonated dyes with non-polar groups, dyes with protonatable groups, dyes with carboxylate groups and dyes with phosphonate groups.

15. The method of claim 10, wherein the ink composition further comprises low-molecular weight hydrophilic compounds.

16. The method of claim 15, wherein the low-molecular weight hydrophilic compounds are selected from the group consisting of inorganic salts and lower alcohols.

17. The method of claim 10, wherein the polyelecrolyte comprises branched polymer chains.

18. The method of claim 10, wherein the cationic polymer is tetrasubstituted ammonium salts.

* * * * *

UNITED STATES PATENT AND TRADEMARK OFFICE
CERTIFICATE OF CORRECTION

| | |
|---|---|
| PATENT NO. | : 7,066,590 B2 |
| APPLICATION NO. | : 10/817288 |
| DATED | : June 27, 2006 |
| INVENTOR(S) | : Lee et al. |

It is certified that error appears in the above-identified patent and that said Letters Patent is hereby corrected as shown below:

In the Claims

Claim 10 Col. 23 (line 18), delete "averaae" and insert therefor --average--.

Signed and Sealed this

Ninth Day of January, 2007

JON W. DUDAS
*Director of the United States Patent and Trademark Office*